(12) United States Patent
Dhanjal et al.

(10) Patent No.: US 8,239,882 B2
(45) Date of Patent: Aug. 7, 2012

(54) MARKUP BASED EXTENSIBILITY FOR USER INTERFACES

(75) Inventors: Savraj Singh Dhanjal, Bellevue, WA (US); Alex Mogilevsky, Bellevue, WA (US); David Andrew Morton, Redmond, WA (US); Preethi Ramani, Seattle, WA (US); Dien Trang Luu, Bothell, WA (US); Eric Michael Faller, Redmond, WA (US); Andrew Fomichev, Sammamish, WA (US); Andy Chung-An Chang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1193 days.

(21) Appl. No.: 11/217,071

(22) Filed: Aug. 30, 2005

(65) Prior Publication Data
US 2007/0055936 A1 Mar. 8, 2007

(51) Int. Cl.
G06F 3/00 (2006.01)
G06F 9/44 (2006.01)
G06F 9/46 (2006.01)
G06F 13/00 (2006.01)

(52) U.S. Cl. ......... 719/319; 719/320; 717/117; 715/765

(58) Field of Classification Search ................... 715/765; 717/117; 719/320, 319
See application file for complete search history.

(56) References Cited

U.S. PATENT DOCUMENTS

| | | |
|---|---|---|
| 4,823,283 A | 4/1989 | Diehm |
| 5,155,806 A | 10/1992 | Hoeber et al. |
| 5,220,675 A | 6/1993 | Padawer et al. |
| 5,247,438 A | 9/1993 | Subas et al. ...................... 700/90 |
| 5,323,314 A | 6/1994 | Baber et al. ....................... 705/8 |
| 5,377,354 A | 12/1994 | Scannell et al. |
| 5,412,772 A | 5/1995 | Monson |
| 5,461,708 A | 10/1995 | Kahn |
| 5,500,936 A | 3/1996 | Allen et al. |
| 5,519,606 A | 5/1996 | Frid-Nielsen et al. |
| 5,533,184 A | 7/1996 | Malcolm |
| 5,559,875 A | 9/1996 | Bieselin et al. .......... 379/202.01 |
| 5,559,944 A | 9/1996 | Ono |
| 5,570,109 A | 10/1996 | Jenson |
| 5,588,107 A | 12/1996 | Bowden et al. |
| 5,592,602 A | 1/1997 | Edmunds |
| 5,596,694 A | 1/1997 | Capps |
| 5,625,783 A | 4/1997 | Ezekiel et al. |
| 5,634,100 A | 5/1997 | Capps |
| 5,634,128 A | 5/1997 | Messina |
| 5,638,504 A | 6/1997 | Scott et al. |

(Continued)

FOREIGN PATENT DOCUMENTS
AU 2005203411 3/2003
(Continued)

OTHER PUBLICATIONS

Clifton, The Application Automation layer—Using XML to Dynamically Generate GUI Elements—forms and controls, The Code Project, Jun. 2003, pp. 1-37.*

(Continued)

Primary Examiner — Diem K Cao
(74) Attorney, Agent, or Firm — Merchant & Gould

(57) ABSTRACT

Methods, systems, and computer products are provided for exposing the programming of an application user interface to allow modification of the associated user interface to include adding, removing, disabling, enabling and repurposing new or existing user interface components.

21 Claims, 5 Drawing Sheets

U.S. PATENT DOCUMENTS

| | | |
|---|---|---|
| 5,644,737 A | 7/1997 | Tuniman et al. |
| 5,659,693 A | 8/1997 | Hansen et al. |
| 5,664,127 A | 9/1997 | Anderson et al. |
| 5,664,208 A | 9/1997 | Pavley et al. |
| 5,673,403 A | 9/1997 | Brown et al. ................. 715/744 |
| 5,721,847 A | 2/1998 | Johnson |
| 5,734,915 A | 3/1998 | Roewer |
| 5,760,768 A | 6/1998 | Gram |
| 5,760,773 A | 6/1998 | Berman et al. |
| 5,761,646 A | 6/1998 | Frid-Nielsen et al. |
| 5,764,960 A | 6/1998 | Perks et al. |
| 5,778,402 A | 7/1998 | Gipson |
| 5,778,404 A | 7/1998 | Capps et al. |
| 5,787,295 A | 7/1998 | Nakao |
| 5,793,365 A | 8/1998 | Tang et al. |
| 5,805,167 A | 9/1998 | van Cruyningen |
| 5,812,132 A | 9/1998 | Goldstein |
| 5,821,936 A | 10/1998 | Shaffer et al. |
| 5,828,376 A | 10/1998 | Solimene et al. |
| 5,838,321 A | 11/1998 | Wolf |
| 5,842,009 A | 11/1998 | Borovoy et al. |
| 5,844,558 A | 12/1998 | Kumar et al. |
| 5,844,572 A | 12/1998 | Schott |
| 5,855,006 A | 12/1998 | Huemoeller et al. |
| 5,872,973 A | 2/1999 | Mitchell et al. |
| 5,873,108 A | 2/1999 | Goyal et al. ................. 715/203 |
| 5,885,006 A | 3/1999 | Sheedy |
| 5,893,073 A | 4/1999 | Kasso et al. ................. 705/8 |
| 5,893,125 A | 4/1999 | Shostak |
| 5,898,436 A | 4/1999 | Stewart et al. |
| 5,899,979 A | 5/1999 | Miller et al. |
| 5,905,863 A | 5/1999 | Knowles et al. |
| 5,914,714 A | 6/1999 | Brown |
| 5,926,806 A | 7/1999 | Marshall et al. |
| 5,936,625 A | 8/1999 | Kahl et al. |
| 5,937,160 A | 8/1999 | Davis et al. ................. 709/203 |
| 5,940,078 A | 8/1999 | Nagarajayya et al. |
| 5,940,847 A | 8/1999 | Fein et al. |
| 5,943,051 A | 8/1999 | Onda et al. |
| 5,960,406 A | 9/1999 | Rasansky et al. |
| 5,970,466 A | 10/1999 | Detjen et al. |
| 5,999,173 A | 12/1999 | Ubillos |
| 5,999,938 A | 12/1999 | Bliss et al. |
| 6,002,395 A | 12/1999 | Wagner et al. |
| 6,008,806 A | 12/1999 | Nakajima et al. |
| 6,012,075 A | 1/2000 | Fein et al. |
| 6,016,478 A | 1/2000 | Zhang et al. ................. 705/9 |
| 6,018,343 A | 1/2000 | Wang et al. |
| 6,034,683 A | 3/2000 | Mansour et al. |
| 6,038,395 A | 3/2000 | Chow et al. |
| 6,038,542 A | 3/2000 | Ruckdashel ................. 705/9 |
| 6,043,816 A | 3/2000 | Williams et al. |
| 6,067,087 A | 5/2000 | Krauss et al. |
| 6,067,551 A | 5/2000 | Brown |
| 6,072,492 A | 6/2000 | Schagen et al. |
| 6,073,142 A | 6/2000 | Geiger |
| 6,085,206 A | 7/2000 | Domini et al. |
| 6,101,480 A | 8/2000 | Conmy et al. |
| 6,133,915 A | 10/2000 | Arcuri et al. |
| 6,154,755 A | 11/2000 | Dellert et al. |
| 6,175,363 B1 | 1/2001 | Williams et al. |
| 6,188,401 B1 | 2/2001 | Peyer |
| 6,188,403 B1 | 2/2001 | Sacerdoti et al. |
| 6,192,381 B1 | 2/2001 | Stiegemeier et al. |
| 6,195,094 B1 | 2/2001 | Celebiler ................. 715/764 |
| 6,199,102 B1 | 3/2001 | Cobb |
| 6,211,879 B1 | 4/2001 | Soohoo |
| 6,216,122 B1 | 4/2001 | Elson |
| 6,219,670 B1 | 4/2001 | Mocek et al. |
| 6,222,540 B1 | 4/2001 | Sacerdoti |
| 6,230,309 B1 | 5/2001 | Turner et al. |
| 6,232,971 B1 | 5/2001 | Haynes |
| 6,236,396 B1 | 5/2001 | Jenson et al. |
| 6,237,135 B1 | 5/2001 | Timbol |
| 6,256,628 B1 | 7/2001 | Dobson et al. |
| 6,269,341 B1 | 7/2001 | Redcay, Jr. ................. 705/8 |
| 6,278,450 B1 | 8/2001 | Arcuri et al. |
| 6,289,317 B1 | 9/2001 | Peterson |
| 6,307,544 B1 | 10/2001 | Harding |
| 6,307,574 B1 | 10/2001 | Ashe |
| 6,323,883 B1 | 11/2001 | Minoura et al. |
| 6,326,962 B1 | 12/2001 | Szabo |
| 6,327,046 B1 | 12/2001 | Miyamoto et al. ........... 358/1.15 |
| 6,341,277 B1 | 1/2002 | Coden |
| 6,353,451 B1 | 3/2002 | Teibel et al. |
| 6,359,634 B1 | 3/2002 | Cragun et al. |
| 6,373,507 B1 | 4/2002 | Camara et al. |
| 6,384,849 B1 | 5/2002 | Morcos et al. |
| 6,385,769 B1 | 5/2002 | Lewallen |
| 6,405,216 B1 | 6/2002 | Minnaert et al. |
| 6,424,829 B1 | 7/2002 | Kraft |
| 6,429,882 B1 | 8/2002 | Abdelnur et al. |
| 6,430,563 B1 | 8/2002 | Fritz |
| 6,433,801 B1 | 8/2002 | Moon et al. |
| 6,433,831 B1 | 8/2002 | Dinwiddie |
| 6,434,598 B1 | 8/2002 | Gish ................. 709/203 |
| 6,442,527 B1 | 8/2002 | Worthington ................. 705/8 |
| 6,456,304 B1 | 9/2002 | Angiulo et al. |
| 6,457,062 B1 | 9/2002 | Pivowar |
| 6,459,441 B1 | 10/2002 | Perroux et al. |
| 6,466,236 B1 | 10/2002 | Pivowar et al. |
| 6,469,722 B1 | 10/2002 | Kinoe et al. |
| 6,469,723 B1 | 10/2002 | Gould |
| 6,480,865 B1 | 11/2002 | Lee et al. |
| 6,484,180 B1 | 11/2002 | Lyons et al. |
| 6,493,006 B1 | 12/2002 | Gourdol et al. |
| 6,493,731 B1 | 12/2002 | Jones et al. |
| 6,507,845 B1 | 1/2003 | Cohen et al. |
| 6,546,417 B1 | 4/2003 | Baker |
| 6,564,377 B1 | 5/2003 | Jayasimha et al. |
| 6,570,596 B2 | 5/2003 | Frederiksen |
| 6,578,192 B1 | 6/2003 | Boehme et al. |
| 6,583,798 B1 | 6/2003 | Hoek et al. |
| 6,618,732 B1 | 9/2003 | White et al. |
| 6,621,504 B1 | 9/2003 | Nadas et al. |
| 6,621,508 B1 | 9/2003 | Shiraishi et al. |
| 6,624,831 B1 | 9/2003 | Shahine et al. |
| 6,635,089 B1 | 10/2003 | Burkett et al. |
| 6,664,983 B2 | 12/2003 | Ludolph |
| 6,680,749 B1 | 1/2004 | Anderson et al. |
| 6,686,938 B1 | 2/2004 | Jobs et al. |
| 6,691,281 B1 | 2/2004 | Sorge et al. |
| 6,701,513 B1 | 3/2004 | Bailey |
| 6,708,205 B2 | 3/2004 | Sheldon et al. |
| 6,721,402 B2 | 4/2004 | Usami |
| 6,727,919 B1 | 4/2004 | Reder et al. |
| 6,732,330 B1 | 5/2004 | Claussen et al. |
| 6,734,880 B2 | 5/2004 | Chang et al. |
| 6,750,890 B1 | 6/2004 | Sugimoto |
| 6,778,990 B2 | 8/2004 | Garcia et al. |
| 6,785,868 B1 | 8/2004 | Raff |
| 6,789,107 B1 | 9/2004 | Bates et al. |
| 6,825,859 B1 | 11/2004 | Severenuk et al. |
| 6,826,729 B1 | 11/2004 | Giesen et al. |
| 6,850,255 B2 | 2/2005 | Muschetto |
| 6,857,103 B1 | 2/2005 | Wason |
| 6,871,195 B2 | 3/2005 | Ryan et al. |
| 6,882,354 B1 | 4/2005 | Nielsen |
| 6,895,426 B1 | 5/2005 | Cortright et al. |
| 6,904,449 B1 | 6/2005 | Quinones |
| 6,906,717 B2 | 6/2005 | Couckuyt et al. |
| 6,915,492 B2 | 7/2005 | Kurtenbach et al. |
| 6,924,797 B1 | 8/2005 | MacPhail |
| 6,925,605 B2 | 8/2005 | Bates |
| 6,928,613 B1 | 8/2005 | Ishii |
| 6,931,623 B2 | 8/2005 | Vermeire et al. |
| 6,941,304 B2 | 9/2005 | Gainey |
| 6,964,025 B2 | 11/2005 | Angiulo et al. |
| 6,983,889 B2 | 1/2006 | Alles |
| 6,988,241 B1 | 1/2006 | Guttman et al. |
| 6,990,637 B2 | 1/2006 | Anthony et al. |
| 6,990,652 B1 | 1/2006 | Parthasarathy et al. |
| 6,990,654 B2 | 1/2006 | Carroll, Jr. |
| 7,016,864 B1 | 3/2006 | Notz et al. |
| 7,027,463 B2 | 4/2006 | Mathew et al. |
| 7,032,210 B2 | 4/2006 | Alloing et al. |
| 7,039,596 B1 | 5/2006 | Lu |

| Patent No. | Date | Name |
|---|---|---|
| 7,046,848 B1 | 5/2006 | Olcott |
| 7,069,538 B1 | 6/2006 | Renshaw |
| 7,086,006 B2 | 8/2006 | Subramanian |
| 7,093,162 B2 | 8/2006 | Barga et al. |
| 7,107,544 B1 | 9/2006 | Luke |
| 7,110,936 B2 | 9/2006 | Hiew et al. |
| 7,111,238 B1 | 9/2006 | Kuppusamy et al. |
| 7,117,370 B2 | 10/2006 | Khan |
| 7,117,436 B1 | 10/2006 | O'Rourke |
| 7,149,983 B1 | 12/2006 | Robertson |
| 7,152,207 B1 | 12/2006 | Underwood et al. |
| 7,174,361 B1 | 2/2007 | Paas |
| 7,181,697 B2 | 2/2007 | Tai |
| 7,188,073 B1 | 3/2007 | Tam et al. |
| 7,188,158 B1 | 3/2007 | Stanton et al. |
| 7,188,317 B1 | 3/2007 | Hazel |
| 7,206,813 B2 | 4/2007 | Dunbar |
| 7,206,814 B2 | 4/2007 | Kirsch |
| 7,212,208 B2 | 5/2007 | Khozai |
| 7,216,301 B2 | 5/2007 | Moehrle |
| 7,218,976 B2 | 5/2007 | Minagawa |
| 7,219,305 B2 * | 5/2007 | Jennings ............... 715/761 |
| 7,225,244 B2 | 5/2007 | Reynolds |
| 7,234,132 B2 | 6/2007 | Lam |
| 7,240,323 B1 * | 7/2007 | Desai et al. ............ 717/100 |
| 7,249,325 B1 | 7/2007 | Donaldson |
| 7,263,668 B1 | 8/2007 | Lentz |
| 7,281,245 B2 | 10/2007 | Reynar et al. |
| 7,290,033 B1 | 10/2007 | Goldman |
| 7,296,241 B2 | 11/2007 | Oshiro et al. |
| 7,325,204 B2 | 1/2008 | Rogers |
| 7,328,409 B2 | 2/2008 | Awada et al. |
| 7,337,185 B2 | 2/2008 | Ellis et al. |
| 7,346,705 B2 | 3/2008 | Hullot et al. |
| 7,346,769 B2 | 3/2008 | Forlenza et al. |
| 7,356,537 B2 | 4/2008 | Reynar et al. |
| 7,356,772 B2 | 4/2008 | Brownholtz et al. |
| 7,360,174 B2 | 4/2008 | Grossman et al. |
| 7,386,535 B1 | 6/2008 | Kalucha et al. |
| 7,386,835 B1 * | 6/2008 | Desai et al. ............ 717/117 |
| 7,392,249 B1 | 6/2008 | Harris et al. |
| 7,395,221 B2 | 7/2008 | Doss et al. ............ 705/9 |
| 7,395,500 B2 | 7/2008 | Whittle et al. |
| 7,395,540 B2 | 7/2008 | Rogers |
| 7,421,660 B2 | 9/2008 | Charmock et al. ...... 715/751 |
| 7,421,690 B2 | 9/2008 | Forstall |
| 7,426,713 B2 | 9/2008 | Duggan et al. |
| 7,469,385 B2 | 12/2008 | Harper et al. |
| 7,472,117 B2 | 12/2008 | Dettinger |
| 7,472,374 B1 | 12/2008 | Dillman et al. |
| 7,484,213 B2 | 1/2009 | Mathew et al. |
| 7,499,907 B2 | 3/2009 | Brown |
| 7,505,954 B2 | 3/2009 | Heidloff et al. |
| 7,509,328 B2 | 3/2009 | Weiss et al. |
| 7,530,029 B2 | 5/2009 | Satterfield et al. |
| 7,555,707 B1 | 6/2009 | Labarge et al. ........ 715/234 |
| 7,567,964 B2 | 7/2009 | Brice et al. |
| 7,610,575 B2 | 10/2009 | Sproule |
| 7,627,561 B2 | 12/2009 | Pell et al. |
| 7,664,821 B1 | 2/2010 | Ancin et al. |
| 7,703,036 B2 | 4/2010 | Satterfield et al. ...... 715/777 |
| 7,707,255 B2 | 4/2010 | Satterfield et al. ...... 709/206 |
| 7,711,742 B2 | 5/2010 | Bennett |
| 7,716,593 B2 | 5/2010 | Durazo et al. ........ 715/752 |
| 7,747,966 B2 | 6/2010 | Leukart |
| 7,769,698 B2 | 8/2010 | Matic |
| 7,779,386 B2 | 8/2010 | Seitz |
| 7,788,598 B2 | 8/2010 | Bansal |
| 7,802,199 B2 | 9/2010 | Shneerson |
| 7,827,546 B1 | 11/2010 | Jones et al. |
| 7,831,902 B2 | 11/2010 | Sourov et al. |
| 7,853,877 B2 | 12/2010 | Giesen |
| 7,860,901 B2 | 12/2010 | Cheng et al. |
| 7,865,868 B2 | 1/2011 | Falzone Schaw et al. |
| 7,870,465 B2 | 1/2011 | VerSteeg |
| 7,886,290 B2 | 2/2011 | Dhanjal |
| 7,908,580 B2 | 3/2011 | Stubbs et al. |
| 7,925,621 B2 | 4/2011 | Sikchi et al. |
| 8,046,683 B2 | 10/2011 | Larcheveque et al. |
| 8,117,542 B2 | 2/2012 | Radtke et al. |
| 8,146,016 B2 | 3/2012 | Himberger et al. |
| 8,150,930 B2 | 4/2012 | Satterfield et al. |
| 2001/0032220 A1 | 10/2001 | Ven Hoff |
| 2001/0035882 A1 | 11/2001 | Stoakley |
| 2001/0049677 A1 | 12/2001 | Talib et al. |
| 2002/0007380 A1 | 1/2002 | Bauchot et al. |
| 2002/0029247 A1 | 3/2002 | Kawamoto |
| 2002/0036662 A1 | 3/2002 | Gauthier et al. |
| 2002/0037754 A1 | 3/2002 | Hama et al. |
| 2002/0052721 A1 | 5/2002 | Ruff et al. |
| 2002/0052880 A1 | 5/2002 | Fruensgaard |
| 2002/0070977 A1 | 6/2002 | Morcos et al. |
| 2002/0075330 A1 | 6/2002 | Rosenzweig et al. |
| 2002/0078143 A1 | 6/2002 | De Boor et al. |
| 2002/0083054 A1 | 6/2002 | Peltonen et al. ........ 707/5 |
| 2002/0083097 A1 | 6/2002 | Warrington |
| 2002/0091697 A1 | 7/2002 | Huang et al. .......... 707/10 |
| 2002/0091739 A1 | 7/2002 | Ferlitsch et al. |
| 2002/0122071 A1 | 9/2002 | Camara et al. |
| 2002/0133557 A1 | 9/2002 | Winarski |
| 2002/0135621 A1 | 9/2002 | Angiulo et al. |
| 2002/0140731 A1 | 10/2002 | Subramaniam et al. |
| 2002/0140740 A1 | 10/2002 | Chen |
| 2002/0149623 A1 | 10/2002 | West et al. |
| 2002/0149629 A1 | 10/2002 | Craycroft et al. |
| 2002/0154178 A1 | 10/2002 | Barnett et al. |
| 2002/0158876 A1 | 10/2002 | Janssen |
| 2002/0163538 A1 | 11/2002 | Shteyn |
| 2002/0175083 A1 | 11/2002 | Hackworth |
| 2002/0175955 A1 | 11/2002 | Gourdol et al. |
| 2002/0186257 A1 | 12/2002 | Cadiz et al. .......... 715/764 |
| 2002/0196293 A1 | 12/2002 | Suppan et al. |
| 2003/0009455 A1 | 1/2003 | Carlson et al. ........ 707/6 |
| 2003/0011638 A1 | 1/2003 | Chung |
| 2003/0011639 A1 | 1/2003 | Webb |
| 2003/0014421 A1 | 1/2003 | Jung |
| 2003/0014490 A1 | 1/2003 | Bates et al. |
| 2003/0022700 A1 | 1/2003 | Wang |
| 2003/0025732 A1 * | 2/2003 | Prichard ............... 345/765 |
| 2003/0035917 A1 | 2/2003 | Hyman |
| 2003/0038832 A1 | 2/2003 | Sobol |
| 2003/0043200 A1 | 3/2003 | Faieta et al. .......... 345/804 |
| 2003/0043211 A1 | 3/2003 | Kremer et al. |
| 2003/0046528 A1 | 3/2003 | Haitani et al. ......... 713/2 |
| 2003/0066025 A1 | 4/2003 | Garner et al. |
| 2003/0070143 A1 | 4/2003 | Maslov |
| 2003/0084035 A1 | 5/2003 | Emerick |
| 2003/0093490 A1 | 5/2003 | Yamamoto et al. |
| 2003/0097361 A1 | 5/2003 | Huang et al. |
| 2003/0097640 A1 | 5/2003 | Abrams et al. ........ 715/530 |
| 2003/0098891 A1 | 5/2003 | Molander |
| 2003/0106024 A1 | 6/2003 | Silverbrook |
| 2003/0110191 A1 | 6/2003 | Handsaker et al. |
| 2003/0112278 A1 | 6/2003 | Driskell |
| 2003/0135825 A1 * | 7/2003 | Gertner et al. ........ 715/513 |
| 2003/0156140 A1 | 8/2003 | Watanabe |
| 2003/0160821 A1 * | 8/2003 | Yoon ................... 345/762 |
| 2003/0163455 A1 | 8/2003 | Dettinger et al. |
| 2003/0163537 A1 | 8/2003 | Rohall et al. |
| 2003/0167310 A1 | 9/2003 | Moody et al. |
| 2003/0169284 A1 | 9/2003 | Dettinger et al. |
| 2003/0195937 A1 | 10/2003 | Kircher et al. |
| 2003/0206646 A1 | 11/2003 | Brackett |
| 2003/0218611 A1 | 11/2003 | Ben-Tovim et al. |
| 2003/0226106 A1 | 12/2003 | McKellar et al. |
| 2003/0227481 A1 | 12/2003 | Arend et al. |
| 2003/0227487 A1 | 12/2003 | Hugh |
| 2003/0233419 A1 | 12/2003 | Beringer |
| 2004/0003351 A1 | 1/2004 | Sommerer et al. |
| 2004/0006570 A1 | 1/2004 | Gelb |
| 2004/0012633 A1 | 1/2004 | Helt |
| 2004/0021647 A1 | 2/2004 | Iwema et al. |
| 2004/0030993 A1 | 2/2004 | Hong Huey et al. |
| 2004/0056894 A1 | 3/2004 | Zaika et al. |
| 2004/0083432 A1 | 4/2004 | Kawamura et al. |
| 2004/0088359 A1 | 5/2004 | Simpson |
| 2004/0090315 A1 | 5/2004 | Mackjust et al. |
| 2004/0100504 A1 | 5/2004 | Sommer |

| Pub. No. | Date | Inventor | Class |
|---|---|---|---|
| 2004/0100505 A1 | 5/2004 | Cazier | |
| 2004/0107197 A1 | 6/2004 | Shen et al. | |
| 2004/0109025 A1 | 6/2004 | Hullot et al. | |
| 2004/0109033 A1 | 6/2004 | Vienneau et al. | |
| 2004/0117451 A1 | 6/2004 | Chung | |
| 2004/0119760 A1 | 6/2004 | Grossman et al. | |
| 2004/0122789 A1 | 6/2004 | Ostertag et al. | 707/1 |
| 2004/0125142 A1 | 7/2004 | Mock | |
| 2004/0128275 A1 | 7/2004 | Moehrle | |
| 2004/0133854 A1 | 7/2004 | Black | |
| 2004/0142720 A1 | 7/2004 | Smethers | |
| 2004/0153373 A1 | 8/2004 | Song et al. | |
| 2004/0153968 A1 | 8/2004 | Ching | |
| 2004/0164983 A1 | 8/2004 | Khozai | |
| 2004/0168153 A1 | 8/2004 | Marvin | |
| 2004/0181471 A1 | 9/2004 | Rogers | |
| 2004/0186775 A1 | 9/2004 | Margiloff et al. | |
| 2004/0189694 A1 | 9/2004 | Kurtz et al. | |
| 2004/0192440 A1 | 9/2004 | Evans et al. | 463/30 |
| 2004/0215612 A1 | 10/2004 | Brody | |
| 2004/0221234 A1 | 11/2004 | Imai | |
| 2004/0230508 A1 | 11/2004 | Minnis et al. | |
| 2004/0230906 A1 | 11/2004 | Pik et al. | |
| 2004/0239700 A1 | 12/2004 | Baschy | |
| 2004/0243938 A1 | 12/2004 | Weise et al. | |
| 2004/0260756 A1 | 12/2004 | Forstall et al. | |
| 2004/0261013 A1 | 12/2004 | Wynn et al. | 715/511 |
| 2004/0268231 A1 | 12/2004 | Tunning | |
| 2004/0268270 A1 | 12/2004 | Hill et al. | 715/963 |
| 2005/0004989 A1 | 1/2005 | Satterfield et al. | 709/206 |
| 2005/0004990 A1 | 1/2005 | Durazo et al. | |
| 2005/0005235 A1 | 1/2005 | Satterfield et al. | 715/519 |
| 2005/0005249 A1 | 1/2005 | Hill et al. | |
| 2005/0010871 A1 | 1/2005 | Ruthfield et al. | |
| 2005/0021504 A1 | 1/2005 | Atchison | |
| 2005/0022116 A1 | 1/2005 | Bowman et al. | |
| 2005/0033614 A1 | 2/2005 | Lettovsky | |
| 2005/0039142 A1 | 2/2005 | Jalon et al. | |
| 2005/0043015 A1 | 2/2005 | Muramatsu | |
| 2005/0044500 A1 | 2/2005 | Orimoto et al. | |
| 2005/0055449 A1 | 3/2005 | Rappold, III | 709/228 |
| 2005/0057584 A1 | 3/2005 | Gruen et al. | |
| 2005/0086135 A1 | 4/2005 | Lu | |
| 2005/0091576 A1 | 4/2005 | Relyea et al. | 715/502 |
| 2005/0097465 A1 | 5/2005 | Giesen et al. | 715/700 |
| 2005/0097511 A1 | 5/2005 | Bergman et al. | |
| 2005/0114778 A1 | 5/2005 | Branson | |
| 2005/0117179 A1 | 6/2005 | Ito et al. | |
| 2005/0132010 A1 | 6/2005 | Muller | |
| 2005/0132053 A1 | 6/2005 | Roth et al. | |
| 2005/0138576 A1 | 6/2005 | Baumert et al. | |
| 2005/0144241 A1 | 6/2005 | Stata et al. | |
| 2005/0144284 A1 | 6/2005 | Ludwig et al. | 709/226 |
| 2005/0144568 A1 | 6/2005 | Gruen et al. | |
| 2005/0154765 A1 | 7/2005 | Seitz | |
| 2005/0172262 A1 | 8/2005 | Lalwani | |
| 2005/0177789 A1 | 8/2005 | Abbar et al. | |
| 2005/0183008 A1 | 8/2005 | Crider et al. | |
| 2005/0203975 A1 | 9/2005 | Jindal et al. | 707/204 |
| 2005/0216863 A1 | 9/2005 | Schumacher et al. | |
| 2005/0223066 A1 | 10/2005 | Buchheit et al. | |
| 2005/0223329 A1 | 10/2005 | Schwartz et al. | |
| 2005/0234910 A1 | 10/2005 | Buchheit | |
| 2005/0240902 A1 | 10/2005 | Bunker et al. | |
| 2005/0251757 A1 | 11/2005 | Farn | |
| 2005/0256867 A1 | 11/2005 | Walther et al. | |
| 2005/0278656 A1 | 12/2005 | Goldthwaite et al. | |
| 2005/0289109 A1 | 12/2005 | Arrouye et al. | 707/1 |
| 2005/0289156 A1 | 12/2005 | Maryka et al. | |
| 2005/0289158 A1 | 12/2005 | Weiss | |
| 2006/0015816 A1* | 1/2006 | Kuehner et al. | 715/744 |
| 2006/0020962 A1 | 1/2006 | Stark | |
| 2006/0026033 A1 | 2/2006 | Brydon | |
| 2006/0026213 A1 | 2/2006 | Yaskin | |
| 2006/0026242 A1 | 2/2006 | Kuhlmann | |
| 2006/0036580 A1 | 2/2006 | Stata et al. | |
| 2006/0036945 A1 | 2/2006 | Radtke et al. | |
| 2006/0036946 A1 | 2/2006 | Radtke et al. | 715/711 |
| 2006/0036950 A1 | 2/2006 | Himberger et al. | 715/732 |
| 2006/0036964 A1 | 2/2006 | Satterfield et al. | 715/777 |
| 2006/0036965 A1 | 2/2006 | Harris et al. | |
| 2006/0041545 A1 | 2/2006 | Heidloff et al. | |
| 2006/0047644 A1 | 3/2006 | Bocking et al. | |
| 2006/0053383 A1 | 3/2006 | Gauthier et al. | |
| 2006/0059035 A1 | 3/2006 | Kraft | |
| 2006/0061738 A1 | 3/2006 | Rizzo | |
| 2006/0064434 A1 | 3/2006 | Gilbert | |
| 2006/0069604 A1 | 3/2006 | Leukart et al. | 705/9 |
| 2006/0069684 A1 | 3/2006 | Vadlamani et al. | |
| 2006/0069686 A1 | 3/2006 | Beyda et al. | 707/10 |
| 2006/0080303 A1 | 4/2006 | Sargent et al. | |
| 2006/0080363 A1 | 4/2006 | Vadlamani et al. | |
| 2006/0080468 A1 | 4/2006 | Vadlamani et al. | |
| 2006/0095865 A1 | 5/2006 | Rostom | |
| 2006/0101051 A1 | 5/2006 | Carr et al. | |
| 2006/0101350 A1 | 5/2006 | Scott | |
| 2006/0111931 A1 | 5/2006 | Johnson et al. | |
| 2006/0117249 A1 | 6/2006 | Hu et al. | |
| 2006/0117302 A1 | 6/2006 | Mercer et al. | 717/131 |
| 2006/0129937 A1 | 6/2006 | Shafron | |
| 2006/0132812 A1 | 6/2006 | Barnes et al. | |
| 2006/0155689 A1 | 7/2006 | Blakeley | |
| 2006/0161849 A1 | 7/2006 | Miller et al. | |
| 2006/0161863 A1 | 7/2006 | Gallo | 715/810 |
| 2006/0165105 A1 | 7/2006 | Shenfield et al. | |
| 2006/0168522 A1 | 7/2006 | Bala | |
| 2006/0173824 A1 | 8/2006 | Bensky | |
| 2006/0173961 A1 | 8/2006 | Turski et al. | |
| 2006/0200432 A1 | 9/2006 | Flinn et al. | |
| 2006/0218500 A1 | 9/2006 | Sauve et al. | |
| 2006/0224946 A1 | 10/2006 | Barrett | |
| 2006/0242557 A1* | 10/2006 | Nortis, III | 715/509 |
| 2006/0242575 A1 | 10/2006 | Winser | |
| 2006/0242591 A1 | 10/2006 | Van Dok | |
| 2006/0248012 A1 | 11/2006 | Kircher | |
| 2006/0253830 A1 | 11/2006 | Rajanala et al. | |
| 2006/0259449 A1 | 11/2006 | Betz | |
| 2006/0271869 A1 | 11/2006 | Thanu et al. | 715/764 |
| 2006/0271910 A1 | 11/2006 | Burcham et al. | |
| 2006/0282817 A1 | 12/2006 | Darst et al. | |
| 2006/0294452 A1 | 12/2006 | Matsumoto | |
| 2006/0294526 A1 | 12/2006 | Hambrick et al. | 719/315 |
| 2007/0006206 A1 | 1/2007 | Dhanjal et al. | |
| 2007/0006327 A1 | 1/2007 | Lal et al. | |
| 2007/0033250 A1 | 2/2007 | Levin et al. | |
| 2007/0050182 A1 | 3/2007 | Sneddon et al. | |
| 2007/0050401 A1 | 3/2007 | Young et al. | |
| 2007/0055943 A1 | 3/2007 | McCormack et al. | 715/746 |
| 2007/0061306 A1 | 3/2007 | Pell et al. | |
| 2007/0061307 A1 | 3/2007 | Hartwell et al. | |
| 2007/0061308 A1 | 3/2007 | Hartwell et al. | |
| 2007/0061705 A1 | 3/2007 | Ammerlaan | |
| 2007/0083813 A1 | 4/2007 | Lui et al. | |
| 2007/0094597 A1 | 4/2007 | Rostom | |
| 2007/0094608 A1 | 4/2007 | Getsch | |
| 2007/0106951 A1 | 5/2007 | McCormack et al. | |
| 2007/0143662 A1 | 6/2007 | Carlson et al. | 715/507 |
| 2007/0143671 A1 | 6/2007 | Paterson et al. | |
| 2007/0156519 A1 | 7/2007 | Agassi et al. | |
| 2007/0179841 A1 | 8/2007 | Agassi et al. | |
| 2007/0180040 A1 | 8/2007 | Etgen et al. | |
| 2007/0185826 A1 | 8/2007 | Brice et al. | |
| 2007/0203991 A1 | 8/2007 | Fisher et al. | |
| 2007/0234290 A1 | 10/2007 | Ronen et al. | |
| 2007/0240057 A1 | 10/2007 | Satterfield et al. | |
| 2007/0260996 A1 | 11/2007 | Jakobson | |
| 2007/0279417 A1 | 12/2007 | Garg et al. | |
| 2007/0282956 A1 | 12/2007 | Staats | |
| 2007/0283287 A1 | 12/2007 | Taylor et al. | |
| 2007/0300168 A1 | 12/2007 | Bosma et al. | |
| 2008/0005686 A1 | 1/2008 | Singh | |
| 2008/0034304 A1 | 2/2008 | Feuerbacher et al. | |
| 2008/0040682 A1 | 2/2008 | Sorenson et al. | |
| 2008/0052670 A1 | 2/2008 | Espinosa et al. | |
| 2008/0077571 A1 | 3/2008 | Harris et al. | |
| 2008/0104505 A1 | 5/2008 | Keohane et al. | |
| 2008/0109787 A1 | 5/2008 | Wang et al. | |
| 2008/0134138 A1 | 6/2008 | Chamieh et al. | 717/105 |

| | | | | | | |
|---|---|---|---|---|---|---|
| 2008/0141156 | A1 | 6/2008 | Reik | TW | 460839 | 10/2001 |
| 2008/0141242 | A1 | 6/2008 | Shapiro | TW | 490652 | 6/2002 |
| 2008/0155555 | A1 | 6/2008 | Kwong ............... 719/315 | WO | 94/20921 | 9/1994 |
| 2008/0178110 | A1 | 7/2008 | Hill et al. | WO | 96/39654 | 12/1996 |
| 2008/0209316 | A1 | 8/2008 | Zandstra | WO | 98/20410 | 5/1998 |
| 2008/0244440 | A1 | 10/2008 | Bailey | WO | WO 99/04353 A1 | 1/1999 |
| 2008/0263462 | A1 | 10/2008 | Mayer-Ullmann | WO | WO 99/27495 | 6/1999 |
| 2009/0007003 | A1 | 1/2009 | Dukhon et al. | WO | 01/55894 | 8/2001 |
| 2009/0012984 | A1 | 1/2009 | Ravid et al. | WO | WO 02/091162 A3 | 11/2002 |
| 2009/0031295 | A1 | 1/2009 | Zhao | WO | WO 03/003240 A2 | 1/2003 |
| 2009/0064090 | A1 | 3/2009 | Anonson | WO | WO 03/003240 A2 | 9/2003 |
| 2009/0083656 | A1 | 3/2009 | Dukhon et al. | WO | WO 03/098500 | 11/2003 |
| 2009/0100009 | A1 | 4/2009 | Karp | WO | WO 2005/103900 A1 | 11/2005 |
| 2009/0106375 | A1 | 4/2009 | Carmel et al. | WO | WO 2007/027737 A1 | 3/2007 |
| 2009/0163183 | A1 | 6/2009 | O'Donoghue et al. | WO | WO 2007/033159 A1 | 3/2007 |
| 2009/0205013 | A1 | 8/2009 | Lowes | WO | WO 2008/121718 A1 | 9/2008 |
| 2009/0217192 | A1 | 8/2009 | Dean et al. | WO | 2009-158151 | 12/2009 |
| 2009/0217263 | A1 | 8/2009 | Gebhart et al. | WO | 2009-158171 | 12/2009 |
| 2009/0222763 | A1 | 9/2009 | Dukhon et al. | WO | 2009-158172 | 12/2009 |
| 2009/0249339 | A1 | 10/2009 | Larsson et al. | | | |
| 2009/0259950 | A1 | 10/2009 | Sullivan et al. | | | |
| 2009/0319619 | A1 | 12/2009 | Affronti | | | |
| 2009/0319911 | A1 | 12/2009 | McCann | | | |
| 2010/0011310 | A1 | 1/2010 | Rainisto | | | |
| 2010/0060645 | A1 | 3/2010 | Garg et al. ............... 345/440 | | | |
| 2010/0146478 | A1 | 6/2010 | Head et al. | | | |
| 2010/0180226 | A1 | 7/2010 | Satterfield | | | |
| 2010/0191818 | A1 | 7/2010 | Satterfield | | | |
| 2010/0211889 | A1 | 8/2010 | Durazo | | | |
| 2010/0223575 | A1 | 9/2010 | Leukart | | | |
| 2010/0293470 | A1 | 11/2010 | Zhao et al. | | | |
| 2011/0072396 | A1 | 3/2011 | Giesen et al. ............... 715/841 | | | |
| 2011/0138273 | A1 | 6/2011 | Radtke et al. | | | |
| 2011/0296322 | A1 | 12/2011 | Dhanjal et al. | | | |
| 2011/0307798 | A1 | 12/2011 | Lezama Guadarrama et al. | | | |

FOREIGN PATENT DOCUMENTS

| | | |
|---|---|---|
| CN | 1746914 | 3/2006 |
| EP | 0 910 007 | 4/1999 |
| EP | 1 077 405 A2 | 2/2001 |
| EP | 1 672 518 | 6/2001 |
| EP | 1 223 503 | 7/2002 |
| EP | 1 376 337 | 2/2004 |
| EP | 1 462 999 A2 | 9/2004 |
| EP | 1 542 133 A2 | 6/2005 |
| EP | 1 835 434 A1 | 9/2007 |
| GB | 2329813 | 3/1999 |
| GB | 2 391 148 | 1/2004 |
| ID | P 0027717 | 3/2011 |
| ID | P 0027754 | 3/2011 |
| ID | P0029297 | 10/2011 |
| JP | 03-043824 | 2/1991 |
| JP | 04-186425 | 7/1992 |
| JP | 05-204579 | 8/1993 |
| JP | 06-342357 | 12/1994 |
| JP | 10-074217 | 3/1998 |
| JP | 10-326171 | 12/1998 |
| JP | 11-175258 | 7/1999 |
| JP | 11-259200 | 9/1999 |
| JP | 2001-503893 | 3/2001 |
| JP | 2001-337944 | 12/2001 |
| JP | 2003-101768 | 4/2003 |
| JP | 2003-256302 | 9/2003 |
| JP | 2004-078512 | 3/2004 |
| JP | 2004-102803 | 3/2004 |
| JP | 2004-512578 | 4/2004 |
| JP | 2004-145569 | 5/2004 |
| JP | 2004-159261 | 6/2004 |
| JP | 2004-342115 | 12/2004 |
| JP | 2005-032041 | 2/2005 |
| JP | 2005-182353 | 7/2005 |
| JP | 2005-236089 | 9/2005 |
| JP | 4832024 | 9/2011 |
| KR | 10-2002-0004723 A | 1/2002 |
| KR | 10-2005-0023805 A | 3/2005 |
| KR | 10-2005-0036702 A | 4/2005 |
| KR | 10-2008-0021262 A | 3/2008 |
| KR | 10-1130421 | 3/2012 |
| PH | 1-2005-000404 | 8/2011 |

OTHER PUBLICATIONS

"User Interface Architecture," Data Master 2003, 2 pages.

Kim et al., "Migrating Legacy Software Systems to CORBA based Distributed Environments through an Automatic Wrapper Generation Technique," http://www.cs.colostate.edu/~bieman/Pubs/KimBieman00.pdf, accessed on Jan. 28, 2009, 6 pages.

Selca, Viki "Customizing the Office Fluent User interface in Access 2007," Microsoft Corporation, Dec. 2006, 22 pages.

European Search Report mailed Dec. 2, 2008, having Application No. EP 06 79 0087, (7 pages).

U.S. Appl. No. 12/414,317, filed Mar. 30, 2009 entitled "Scope-Based Extensibility for Control Surfaces".

Charles Rich et al., "Segmented Interaction History in a Collaborative Interface Agent," 1997, ACM, pp. 23-30.

Andrew Dwelly, "Functions and Dynamic User Interface," 1989, ACM, pp. 371-381.

G. Kurtenbach et al., "The Hotbox: Efficient Access to a Large Number of Menu-items," CHI 99 15-20, pp. 231-237, May 1999.

Charles Rich et al., "Adding a Collaborative Agent to Graphical User Interfaces," 1996, ACM, pp. 21-30.

Boyce, "Microsoft Outlook Inside Out," 2001, pp. 67, 68, 109, 110, 230, 231, 310, 316-318, 798.

Halvorson et al., "Microsoft Office XP Inside Out," 2001, pp. 1005-1009, 1015, 1023-1028, 1036-1039, 1093.

Riggsby et al., "Mastering Lotus Notes and Domino 6," 2003, pp. 135-139.

Riggsby et al., "Mastering Lotus Notes and Domino 6," 2003, pp. 135-138, 607-612.

Khare et al., "The Origin of (Document) Species," University of California, 1998, 9 pgs.

"Separate Structure and Presentation," http://www.webreference.com/html/tutorial5/1.html, Aug. 20, 1998, 4 pgs.

"The Style Attribute and CSS Declarations," http://www.webreference.com/html/tutorial5/2, Aug. 20, 1998, 4 pgs.

"What's Hot in Internet Services?" http://www.webreference.com/html/tutorial5/3, Aug. 20, 1998, 3 pgs.

"The Style Element & CSS Selectors," http://www.webreference.com/html/tutorial5/4.html, Aug. 20, 1998, 3 pgs.

http://www.webreference.com/html/tutorial5/5.html, Aug. 20, 1998, 3 pgs.

"ID & Class Selectors, Pseudoclasses," http://www.webreference.com/html/tutorial5/6.html, Aug. 20, 1998, 3 pgs.

http://www.webreference.com/html/tutorial5/7.html, Aug. 20, 1998, 3 pgs.

http://www.webreference.com/html/tutorial5/8.html, Aug. 20, 1998, 2 pgs.

"External Style Sheets," http://www.webreference.com/html/tutorial5/9.html, Aug. 20, 1998, 3 pgs.

Raman, "Cascaded Speech Style Sheets," 1997, 7 pgs.

Schumaker, "User Interface Standards," http://msdn2.microsoft.com/en-us/library/aa217660(office.11.d=printer).aspx, Sep. 2001, 5 pgs.

Budinsky et al., "WebSphere Studio Overview," http://researchweb.watson.ibm.com/journal/sj/432/budinsky.html, May 6, 2004, 25 pgs.

Gordon Padwick, Using Microsoft Outlook 2000, Que, Sp. Ed., May 1999, 5 pp.

Becker et al., "Virtual Folders: Database Support for Electronic Messages Classification," Pontificia Universadade Catolica do Rio Grande do Sul, Porto Alegre, Brazil, pp. 163-170, 1996.

Goldberg et al., "Using Collaborative Filtering to Weave an Information Tapestry," Communication of the ACM, vol. 35, No. 12, pp. 61-70, Dec. 1992.

Liu et al., "Continual Queries for Internet Scale Event-Driven Information Delivery," IEEE Transactions on Knowledge and Data Engineering, vol. 11, Issue 1, pp. 610-628, 1999.

Chen et al., "NiagaraCQ: A Scalable Continuous Query System for Internet Databases," Int. Conf. On Management of Data, Proc. Of the 2000 ACM SIGMOD Int. Conf. On Management of Data, pp. 379-390, 2000.

Marshall School of Business: "Workshop IV—Calendar," http://www.marshall.usc.edu/computing/PDF_Files/Outlook/Workshop4, PDF, Apr. 10, 2000, pp. 1-4.

M. Williams, "Programming Windows NT4: Unleashed," Sams Publishing, Indianapolis, 1996, pp. index & 167-185.

"Microsoft Outlook 2000: Introduction to Calendar," Version 2002. 03.25, http://www.uakron.edu/its/learning/training/docs/Calendar032502.pdf, Mar. 25, 2002, pp. 1-52.

Screen Dumps of Microsoft Outlook (1999, pp. 1-3).

"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.

"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.

Microsoft Windows XP Professional, Version 2002, Service pack 2, 3 pgs.

Camarda, Using Microsoft Word 97, copyright 1997, QUE Corporation, pp. 412, 869.

Marshall School of Business, Workshop 1—Introduction to Outlook & E-mail, Apr. 6, 2000, pp. 1-11.

Jane Dorothy Calabria Burke, Ten Minute Guide to Lotus Notes 4.6, Publication date: Dec. 23, 1997, 2 pgs.

Bill Dyszel, Microsoft Outlook 2000 for Windows for Dummies, Copyright 1999, pp. 82-86, 102-103, 141,143.

Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.

Screen Dumps Microsoft Corporation, Microsoft Office Professional Edition 2003, 4 pp.

Screen Dumps Microsoft Corporation, Microsoft Office Professional Edition 2003, 5 pp.

Habraken, Microsoft Office XP 8 in 1, published Jun. 5, 2001, http://proquest.safaribooksonline.com/0789725096/, 12 pp.

Word 2002, Chapter 14; Paradigm Publishing Inc., copyright 2002; http://www.emcp.com/tech_tutorials/sig_irc/Signature_Word_Chapter_14.ppt, 21 pp.

Microsoft Office Word 2003, Part of Microsoft Office Professional Edition 2003, 1983-2003 Microsoft Corporation, 5 pp.

Microsoft Office 11 Beta Layperson's Specification, Copyright 2002, Microsoft Corporation, 28 pages.

FrontPage 11 Beta Layperson's Specification, Copyright 2002, Microsoft Corporation, 12 pages.

Office 11 Beta Letter, Copyright 2002, Microsoft Corporation, 6 pages.

Microsoft XDocs Beta Layperson Specification, Copyright 2002, Microsoft Corporation, 3 pages.

Microsoft Publisher 11 Beta Layperson's Specification, Copyright 2002, Microsoft Corporation, 13 pages.

Microsoft Office Word 2003, Part of Microsoft Office Professional Edition 2003, 1983-2003 Microsoft Corporation, screen shot 1, 1 pp.

Microsoft Office 2003, Microsoft Office Professional Edition 2003, Microsoft Corporation, 10 pages.

Screendumps—Microsoft Office, Microsoft Office Professional Edition 2003, Microsoft Corporation, 10 pages.

Screendumps—Microsoft Office Outlook, Microsoft Office Outlook Professional Edition 2003, Microsoft Corporation, 2 pages.

Nielsen, Jacob. "Tabs, Used Right," Alertbox, Sep. 17, 2007, http://www.useit.com/alertbox/tabs.html, 6 pages.

"Managing the Code Editor and View" Microsoft Corporation, http://msdn.microsoft.com/en-us/library/z01zks9a(VS.71).aspx, 2008.

Agarwal, Vikash K., "Creating a Visually Arresting User-Interface: A3D Tab Control Example," Jan. 4, 2008, http://microsoft.apress.com/asptodayarchive/71723/creating-a-visually-arresting-user-interface-a-3d-tab-control-example, 12 pages.

"Omni Web Help," Omni Group, 2004, http://www.omnigroup.com/documentation/omniweb/browser/tabs.html, 2 pages.

Hepfner, Troy, "New SOCET CXP Interface Improves Usability," Sep. 2008, http://www.socetset.com/gxpmosaic/?p=95, 4 pages.

Billo, E. Joseph. "Creating Charts: An Introduction," Excel for Chemists: . A Comprehensive Guide, http://www.ahut.edu.cn/yxsz/ahk/Teaching/Excel%for%20Chemists/ChQ2.pdf, 9 pages, 2001.

Marsh, Bruce, Integrating Spreadsheet Templates and Data Analysis Into Fluid Power Instruction, Journal of Industrial Technology, vol. 16, No. 4, Aug. 2000—Oct. 2000. http://www.nait.org/jit/Articles/marsh071200.pdf, 7 pages.

Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.

Lisa K. Averett; Joshua R. Knisley; Mark A. Marvin; Haiti: Projecting Tactical Network and Systems Management; 1995 IEEE pp. 906-910.

"Convert to Word 2007," http://www.regencytraining.com/word-2007-conversion.html, Regency Training and Consulting, 2 pages. (Date Printed Apr. 21, 2008).

"Customer Story: SourceXtreme," SourceXtreme—Trolltech, http://trolltech.com/customers/casestories/stories/sourcextreme/?searchterm=sourcextreme, 2 pages. (Date Printed Apr. 22, 2008).

"Inter-Widget Communication," http://web.mit.edu/6.115/www/miscfiles/amulet/amulet-help/IWC.htm, 6 pages. (Feb. 13, 2007).

"The Technology in Document and Check Security," http://www.securedoc.in/thetechnology.htm, 7 pages. (Date Printed Apr. 21, 2008).

Ando, R. et al., "Visualization-enabled multi-document summarization by Iterative Residual Rescaling," Natural Language Engineering, vol. 11, No. 1, pp. 67-86 (Mar. 2005) (2 page Abstract).

Bos, B, "Re: A proposal for addition to HTML 3.0: Frames," http://www.nyct.net/~aray/htmlwg/95q3/1141.html, 5 pages. (Sep. 21, 1995).

de Candussio, N., "Common GUI Features Report," Herschel CSDT Meeeting, pp. 1-21 (Sep. 2007).

Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).

Rice, F, "Customizing the 2007 Office System Document Inspector," http://msdn2.microsoft.com/en-us/library/aa338203(d=printer).aspx, 10 pages (May 2006).

Boyce, "Microsoft Outlook Inside Out," 2001, pp. 133, 134, 721-728.

Halvorson et al., "Microsoft Office XP Inside Out," 2001, pp. 4, 5, 10, 11, 70-74, 281-288, 1010-1014.

Pogue, David. "Windows XP Home Edition: The Missing Manual," O'Reilly, 1st Edition, May 1, 2002, pp. 37, 38, 41.

Screendumps—Microsoft Office, Microsoft Corporation, Microsoft Office Professional Edition 2003, 13 pages.

Berliner E.M. et al., "Microsoft Office 2003", Feb. 24, 2004, p. 39-40, 120-124, 175-177, 233-234 [D1].

Berliner E.M. et al., "Microsoft Office 2003", Feb. 24, 2004, p. 173-178 [D2].

Perronne et al. "Building Java Enterprise Systems with J2EE", Publisher: Sams, Pub Date: Jun. 7, 2000 (pp. 1-8).

Padwick, Gordon "Using Microsoft Outlook 2000", 1999 Que Publishing, pp. 530-533.

Slovak, Ken, "Absolute Beginner's Guide to Microsoft Office Outlook 2003," 2003 Que Publishing, pp. 237-241.

Riggsby, McCoy, Haberman and Falciani, "Mastering Lotus Notes and Domino 6." 2003, pp. 18, 22, 33-35, 47, 122, 123, 215-241, 378.

Find any file or email on your PC as fast as you can type!, http://www.xl.com, 2003, 1 page.
"About Google Desktop Search", http://www.desktop.google.com/about.html, Oct. 15, 2004, 8 pages.
"Lookout", http://www.lookoutsoft.com, Apr. 22, 2005, 20 pages.
"Yahoo to test desktop search", http://news.com.com/yahoo+to+test+desktop+searcach/2100-1032_3-5486381.html, Dec. 9, 2004, 6 pages.
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0.1895.1771841.00.asp, Mar. 2, 2005.
"Windows Desktop Search". Http://kunal.kundale.net/reviews/wds.html, Jul. 10, 2005, 7 pages.
"Microsoft Enters Desktop Search Fray", http://www.internetnews.com/ent-news/article.php/3447331, Dec. 13, 2004, 5 pages.
Dennis Schumaker, "User InterfaceStandards", http://msdn2.microsoft.com/en-us/library/aa217660(office.11.d=printer).aspx, Sep. 2001, 5 pages.
"WebSphere Studio Overview", http://researchweb.watson.ibm.com/journal/sj/432/budinsky.html, May 6, 2004, 25 pages.
Parry; "*CREWS: A Component-Driven, Run-Time Extensible Web Service Framework*"; http://eprints.ru.ac.za/74/01/Parry-MSC.pdf; Dec. 2003; 103 Pgs.
Louw, et al.; "Extensible Web Browser Security"; http://www.cs.uic.edu/~venkat/research/papers/extensible-browser-dimva07.pdf; pp. 1-20, 2007.
European Office Action mailed Mar. 9, 2009, Application No. 06790087.8.
International Search Report and Written Opinion mailed Jan. 9, 2007, Application No. PCT/US2006/033809.
International Search Report mailed Aug. 7, 2009, Application No. PCT/US2009/034618.
U.S. Official Action dated Nov. 25, 2008 cited in U.S. Appl. No. 11/154,278.
U.S. Appl. No. 12/814,084, filed Jun. 11, 2010 entitled "Merging Modifications to User Interface Components While Preserving User Customization".
U.S. Appl. No. 12/331,451, filed Dec. 10, 2008 entitled "Multi-Layered Storage and Management of Software Components" (Microsoft case).
"Primary Windows," Accessed at http://www-03.ibm.com/servers/eserver/iseries/navigator/guidelines/primary.html on Feb. 23, 2007, 23 pgs.
Microsoft Press, Microsoft Computer Dictionary, Microsoft Press, Fifth Edition, 2002, pp. 374, 382.
U.S. Appl. No. 12/725,605, filed Mar. 17, 2010 entitled "Improved User Interface for Displaying Selectable Software Functionality Controls that are Relevant to a Selected Object".
U.S. Appl. No. 12/753,923, filed Apr. 5, 2010 entitled "Automatic Grouping of Electronic Mail".
U.S. Appl. No. 12/769,787, filed Apr. 29, 2010 entitled "Conversation Grouping of Electronic Mail Records".
U.S. Appl. No. 12/777,287 filed May 11, 2010 entitled "User Interface for Providing Task Management and Calendar Information".
Screendumps—Microsoft Office (Microsoft Corporation, Microsoft Office Professional Edition 2003); 16 pages (Copyright 1983-2003)).
Danish Written Opinion Appl. No. SG 200504508-3 dated Sep. 18, 2006.
Danish Search Report Appl. No. SG 200504475-5 dated Sep. 19, 2006.
NZ Application No. 541301, Examination Report dated Jul. 25, 2005.
NZ Application No. 541300, Examination Report dated Jul. 25, 2005.
NZ Application No. 541299, Examination Report dated Jul. 25, 2005.
Australian Search Report dated Jan. 16, 2007 cited in Singapore Application No. 200504474-8.
PCT Search Report dated Feb. 6, 2007 cited in International Application No. PCT/US2006/035467.
PCT Search Report dated Feb. 26, 2007 cited in International Application No. PCT/US2006/034993.
European Communicated dated Oct. 20, 2005 cited in EP Application No. 04102463.0-2211 PCT/.
International Search Report dated Oct. 17, 2007 cited in International Application No. PCT/US2006/012724.
International Search Report dated Nov. 27, 2007 in PCT/US2007/012573, 9 pages.
Australian Written Opinion/Search Report cited in Singapore Application No. 200505257-6 mailed Feb. 12, 2007.
Chinese First Office Action dated Mar. 21, 2008 cited in Appln No. 200510092146.4.
Chinese First Office Action dated Mar. 21, 2008 cited in Appln No. 200510092139.4.
Chinese First Office Action dated Apr. 11, 2008 cited in Appln No. 200510092141.1.
Chinese First Office Action dated Apr. 18, 2008 cited in Appln No. 200510092142.6.
Philippines Examiner's Action dated Apr. 21, 2008 cited in Appln No. 1-2005-000405.
Philippines Examiner's Action dated Apr. 21, 2008 cited in Appln No. 1-2005-000406.
Chilean Office Action dated Mar. 28, 2008 cited in Appln No. 1770-05, no English Translation.
Chinese First Office Action dated May 23, 2008 cited in Appln No. 200510089514.X.
European Summons to Attend Oral Proceedings dated Jun. 23, 2008 cited in Appln No. 04102463.9.
Philippines Examiner's Action dated Jul. 31, 2008 cited in Appln No. 12005000495.
Philippines Examiner's Action dated Aug. 19, 2008 cited in Appln No. 12005000405.
Philippines Examiner's Action dated Sep. 12, 2008 cited in Appln No. 1200500406.
Chinese Second Office Action dated Oct. 10, 2008 cited in Appln No. 200510092141.1.
Chinese Second Office Action dated Oct. 17, 2008 cited in Appln No. 200510092139.4.
Chinese Second Office Action dated Nov. 21, 2008 cited in Appln No. 200510089514.X.
Chilean Office Action dated Nov. 27, 2008 cited in Appln No. 1768-2005.
Chilean Office Action dated Sep. 23, 2008 cited in Appln No. 1770-2005.
Chilean Office Action dated Nov. 27, 2008 cited in Appln No. 1769-2005.
Mexican Office Action dated Feb. 5, 2009 cited in Appln No. PA/a/2005/008349.
Mexican Office Action dated Mar. 3, 2009 cited in Appln No. PA/a/2005/008351 English language only.
Chilean Second Office Action dated Mar. 4, 2009 cited in Appln No. 2512-2005.
Chinese Office Action dated Apr. 3, 2009 cited in Appln No. 200510089514.X.
Supplementary European Search Report dated Jun. 9, 2009 cited in EP Application No. 07795391.7-1225.
Chinese Third Office Action dated Jun. 19, 2009 cited in Appln No. 200510092139.4.
Mexican Office Action dated Jun. 19, 2009 cited in Appln. No. PA/a/2005/007073.
Russian Office Action dated Jun. 24, 2009 cited in Appln No. 2005120363/28(023023).
Chinese Office Action dated Jul. 3, 2009 cited in Appln. No. 200680018095.3.
Russian Office Action dated Jul. 21, 2009 cited in Appln No. 2005125837/09(029011).
Russian Office Action dated Jul. 30, 2009 cited in Appln No. 2005125831/09(029005).
Israeli Office Action dated Sep. 6, 2009 cited in Appln No. 169716.
Israeli Office Action dated Sep. 7, 2009 cited in Appln No. 169718.
European Search Report dated Sep. 7, 2009 cited in EP Application No. 09006972.5-2211.
Russian Office Action dated Sep. 10, 2009 cited in Appln No. 2005125836/09(029010).
Russian Office Action dated Sep. 10, 2009 cited in Appln No. 2005125839/09(029013).

European Communication dated Sep. 14, 2009 cited in Appln. No. 07795391.7-1225.
European Communication dated Sep. 28, 2009 cited in Appln No. 09006972.5-2211.
Israeli Office Action dated Oct. 12, 2009 cited in Appln No. 170668.
Chinese Office Action dated Oct. 16, 2009 cited in Appln No. 200510092142.6.
Russian Office Action dated Oct. 26, 2009 cited in Appln No. 2005120363/09(023023).
Russian Office Action dated Oct. 30, 2009 cited in Appln No. 2005125837/09(029011).
Chilean Second Office Action dated Nov. 4, 2009 cited in Appln No. 1770-2005.
Chinese Office Action dated Nov. 27, 2009 cited in Appln No. 200680033212.3.
PCT Search Report and Written Opinion dated Nov. 30, 2009 cited in International Application No. PCT/US2009/046341.
Chilean Second Office Action dated Dec. 4, 2009 cited in Appln No. 1768-2005.
Russian Office Action dated Dec. 28, 2009 cited in Appln No. 2005125836/09(029010).
PCT Search Report and Written Opinion dated Dec. 29, 2009 cited in International Application No. PCT/US2009/046344.
Chinese Office Action dated Jan. 22, 2010 cited in Appln No. 200680032564.7.
Chilean Second Office Action dated Jan. 29, 2010 cited in Appln No. 1769-2005.
Chinese Third Office Action dated Feb. 12, 2010 cited in Appln No. 200510092142.6.
Philippines Examiner's Action dated Mar. 11, 2010 cited in Appln No. 1-2005-000405.
Chinese Office Action dated Mar. 11, 2010 cited in Appln No. 200780020312.7.
Australian Office Action dated Mar. 25, 2010 cited in Appln No. 2005203411.
Australian Office Action dated Mar. 25, 2010 cited in Appln No. 2005203412.
Australian Office Action dated Mar. 26, 2010 cited in Appln No. 2005203409.
Australian Office Action dated Apr. 8, 2010 cited in Appln No. 2005203410.
Australian Office Action dated May 28, 2010 cited in Appln No. 2005202717.
U.S. Official Action dated Dec. 23, 2003 in U.S. Appl. No. 09/896,384.
U.S. Official Action dated Apr. 27, 2006 in U.S. Appl. No. 10/800,056.
U.S. Official Action dated Jul. 26, 2006 in U.S. Appl. No. 10/741,407.
U.S. Final Official Action dated Oct. 19, 2006 in U.S. Appl. No. 10/800,056.
U.S. Official Action dated Jan. 4, 2007 in U.S. Appl. No. 10/607,020.
U.S. Final Official Action dated Jan. 23, 2007 in U.S. Appl. No. 10/741,407.
U.S. Official Action dated Apr. 12, 2007 in U.S. Appl. No. 10/851,506.
U.S. Official Action dated Jun. 4, 2007 in U.S. Appl. No. 10/955,940.
U.S. Official Action dated Jun. 14, 2007 in U.S. Appl. No. 10/836,154.
U.S. Official Action dated Jun. 21, 2007 in U.S. Appl. No. 10/955,928.
U.S. Official Action dated Jul. 11, 2007 in U.S. Appl. No. 10/955,941.
U.S. Official Action dated Jul. 11, 2007 in U.S. Appl. No. 10/955,967.
U.S. Official Action dated Jul. 11, 2007 in U.S. Appl. No. 10/955,942.
U.S. Official Action dated Jul. 13, 2007 in U.S. Appl. No. 10/800,056.
U.S. Official Action dated Sep. 6, 2007 in U.S. Appl. No. 11/136,800.
U.S. Official Action dated Sep. 26, 2007 in U.S. Appl. No. 11/151,686.
U.S. Official Action dated Oct. 9, 2007 in U.S. Appl. No. 10/982,073.
U.S. Official Action dated Dec. 4, 2007 in U.S. Appl. No. 10/955,940.
U.S. Official Action dated Dec. 21, 2007 in U.S. Appl. No. 10/851,506.
U.S. Official Action dated Dec. 28, 2007 in U.S. Appl. No. 10/800,056.
U.S. Official Action dated Jan. 8, 2008 in U.S. Appl. No. 10/955,928.
U.S. Official Action dated Jan. 28, 2008 in U.S. Appl. No. 10/836,154.
U.S. Official Action dated Feb. 20, 2008 in U.S. Appl. No. 10/848,774.
U.S. Official Action dated Feb. 21, 2008 in U.S. Appl. No. 10/851,442.
U.S. Official Action dated Feb. 22, 2008 in U.S. Appl. No. 11/445,393.
U.S. Official Action dated Apr. 15, 2008 in U.S. Appl. No. 10/955,942.
U.S. Official Action dated Apr. 16, 2008 in U.S. Appl. No. 10/955,967.
U.S. Official Action dated Apr. 29, 2008 in U.S. Appl. No. 10/955,941.
U.S. Official Action dated May 28, 2008 in U.S. Appl. No. 10/982,073.
U.S. Official Action dated May 30, 2008 in U.S. Appl. No. 11/430,562.
U.S. Official Action dated Jun. 19, 2008 in U.S. Appl. No. 10/851,506.
U.S. Official Action dated Jun. 20, 2008 in U.S. Appl. No. 10/955,928.
U.S. Official Action dated Jun. 27, 2008 in U.S. Appl. No. 11/430,416.
U.S. Official Action dated Jul. 9, 2008 in U.S. Appl. No. 11/136,800.
U.S. Official Action dated Jul. 17, 2008 in U.S. Appl. No. 10/955,940.
U.S. Official Action dated Jul. 24, 2008 in U.S. Appl. No. 11/151,686.
U.S. Official Action dated Oct. 8, 2008 in U.S. Appl. No. 11/445,393.
U.S. Official Action dated Oct. 28, 2008 in U.S. Appl. No. 11/151,686.
U.S. Official Acton dated Nov. 13, 2008 in U.S. Appl. No. 11/430,562.
U.S. Official Action dated Nov. 25, 2008 in U.S. Appl. No. 11/154,278.
U.S. Official Action dated Dec. 11, 2008 in U.S. Appl. No. 10/982,073.
U.S. Official Action dated Dec. 23, 2008 in U.S. Appl. No. 10/955,942.
U.S. Official Action dated Dec. 24, 2008 in U.S. Appl. No. 10/955,967.
U.S. Official Action dated Jan. 6, 2009 in U.S. Appl. No. 10/955,941.
U.S. Official Action dated Jan. 9, 2009 in U.S. Appl. No. 11/430,561.
U.S. Official Action dated Mar. 18, 2009 in U.S. Appl. No. 11/401,470.
U.S. Official Action dated Apr. 7, 2009 in U.S. Appl. No. 10/955,940.
U.S. Official Action dated Apr. 28, 2009 in U.S. Appl. No. 12/028,797.
U.S. Official Action dated Jun. 1, 2009 in U.S. Appl. No. 11/445,393.
U.S. Official Action dated Jun. 8, 2009 in U.S. Appl. No. 10/982,073.
U.S. Official Action dated Jun. 10, 2009 in U.S. Appl. No. 11/154,278.
U.S. Official Action dated Jun. 11, 2009 in U.S. Appl. No. 11/151,686.
U.S. Official Acton dated Jun. 19, 2009 in U.S. Appl. No. 11/430,562.
U.S. Official Action dated Jun. 24, 2009 in U.S. Appl. No. 10/607,020.
U.S. Official Action dated Aug. 4, 2009 in U.S. Appl. No. 10/955,967.
U.S. Official Action dated Aug. 4, 2009 in U.S. Appl. No. 10/955,942.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Sep. 23, 2009 in U.S. Appl. No. 11/401,470.
U.S. Official Action dated Nov. 13, 2009 in U.S. Appl. No. 11/154,278.
U.S. Official Action dated Nov. 24, 2009 in U.S. Appl. No. 11/445,393.
U.S. Official Action dated Dec. 8, 2009 in U.S. Appl. No. 11/151,686.
U.S. Official Action dated Dec. 9, 2009 in U.S. Appl. No. 12/028,797.
U.S. Official Action dated Dec. 10, 2009 in U.S. Appl. No. 10/955,940.

U.S. Official Action dated Jan. 6, 2010 in U.S. Appl. No. 10/607,020.
U.S. Official Acton dated Jan. 7, 2010 in U.S. Appl. No. 11/430,562.
U.S. Official Action dated Jan. 20, 2010 in U.S. Appl. No. 10/955,967.
U.S. Official Action dated Jan. 25, 2010 in U.S. Appl. No. 10/982,073.
U.S. Official Action dated Feb. 18, 2010 in U.S. Appl. No. 11/782,059.
U.S. Official Action dated Feb. 19, 2010 in U.S. Appl. No. 10/955,942.
U.S. Official Action dated Feb. 22, 2010 in U.S. Appl. No. 11/401,470.
U.S. Official Action dated Apr. 15, 2010 in U.S. Appl. No. 11/823,999.
U.S. Official Action dated May 5, 2010 in U.S. Appl. No. 10/851,506.
U.S. Official Action dated May 25, 2010 in U.S. Appl. No. 10/607,020.
U.S. Official Action dated Jun. 3, 2010 in U.S. Appl. No. 12/028,797.
Chinese Second Office Action in Appln No. 200680033212.3 dated Jul. 6, 2010.
Screenshot of MS Office 2003; Microsoft Office Professional Edition 2003; Microsoft-Corporation,6-pgs.
US Non-Final Office Action in U.S. Appl. No. 11/430,562 dated Jun. 22, 2010.
US Final Office Action in U.S. Appl. No. 10/955,940 dated Jun. 23, 2010.
US Non-Final Office Action in U.S. Appl. No. 11/782,059 dated Jul. 1, 2010.
US Final Office Action in U.S. Appl. No. 10/955,967 dated Jul. 6, 2010.
Halvorson et al., Microsoft Office Professional Official Manual, Aug. 20, 2002, 10 pages.
Mexican Office Action dated Aug. 12, 2010 cited in Appln No. 2005/008354.
U.S. Official Action dated Aug. 2, 2010 in U.S. Appl. No. 10/955,942.
U.S. Official Action dated Aug. 6, 2010 in U.S. Appl. No. 11/401,470.
U.S. Official Action in U.S. Appl. No. 11/430,562 dated Dec. 16, 2010.
U.S. Official Action in U.S. Appl. No. 11/445,393 dated Dec. 20, 2010.
U.S. Official Action in U.S. Appl. No. 12/028,787 dated Dec. 29, 2010.
U.S. Official Action dated Dec. 20, 2010 in U.S. Appl. No. 12/574,256.
U.S. Official Action dated Jan. 5, 2011 in U.S. Appl. No. 11/823,999.
Adler, "Emerging Standards for Component Software," Cybersquare, 1995 IEEE, 10 pgs.
Chamberland, et al., "IBM VisualAge for Java," vol. 37, No. 3, 1998, 26 pgs., http://researchweb.watson.ibm.com/journal/sj/373/chamberland.html [Accessed Feb. 6, 2007].
Zykov, "ConceptModeller: A Problem-Oriented Visual SDK for Globally Distributed Enterprise Systems." Proceedings of the 7th International Workshop on Computer Science and Information Technologies, CSIT 2005, 4 pgs.
"Create Office add-ins: ribbons, toolbars, taskpanes, menus etc.", http://www.add-in-express.com/creating-addins-blog/feed/, 49 pgs, 2007.
"RibbonX API: Extend the 2007 Office System with Your Own Ribbon Tabs and Controls", 2007, Microsoft Corporation, http://msdn.microsoft.com/msdnmag/issues/07/02RibbonX/default.aspx, 12 pgs.
"What's New in Excel 2007", Feb. 26, 2007, 24 pgs.
Whitechapel et al., "Microsoft Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new+features+introduced+in+VSTO+2005_SE&hl=en&ct=clnk&cd=3&gl=in, 37 pgs.
"TeeChart for .NET Charting Conatrol," Steema Software; accessed at: http://www.teechart.net/; accesed on Jan. 11, 2006, 4 pages.
Mexican Office Action cited in Appln No. 2005/008354 dated May 4, 2010, 5 pages.
U.S. Final Office Action in U.S. Appl. No. 10/836,154 dated Sep. 27, 2010; 40 pages.
Australian Office Action dated Oct. 21, 2010 cited in Appln No. 2006284908.
Chinese Second Office Action dated Oct. 29, 2010 cited in Appln No. 200680030421.2.
European Search Report dated Nov. 25, 2008 cited in Application EP 06 79 0087.
Israeli Office Action dated Jul. 5, 2010 cited in Appln No. 169718.
Malaysian Substantive Examination Adverse Report dated Sep. 30, 2010 cited in Appln No. PI 20052959.
PCT Written Opinion and Search Report dated Sep. 2, 2010 cited in International Application No. PCT/U52010/021888.
U.S. Official Action dated Nov. 9, 2010 in U.S. Appl. No. 10/607,020.
"Microsoft Office Professional Plus 2007," Microsoft Corporation; © 2006, 66 pages.
Bellavista et al., "A Mobile Infrastructure for Terminal, User, and Resource Mobility," Network Operations and Management Symposium, IEEE/IFIP, 2000, pp. 877-890.
Israeli Office Action in Israeli Appln No. 169716 dated Oct. 28, 2010, 4 pages.
U.S. Official Action in U.S. Appl. No. 10/851,506, Dec. 8, 2010, 21 pages.
U.S. Official Action in U.S. Appl. No. 10/955,967, Dec. 8, 2010, 29 pages.
U.S. Official Action in U.S. Appl. No. 11/782,059, Nov. 22, 2010, 32 pages.
U.S. Official Action in U.S. Appl. No. 12/753,923, Nov. 26, 2010, 55 pages.
U.S. Appl. No. 12/954,952 entitled "Gallery User Interface Controls" filed Nov. 29, 2010.
Notice on Reexamination dated Jan. 21, 2011 cited in Appln No. 200510089514.X.
Chinese Third Office Action dated Feb. 10, 2011 cited in Appln No. 200680033212.3.
U.S. Official Action dated Feb. 11, 2011 in U.S. Appl. No. 11/401,470.
2nd Notice on Reexamination dated Mar. 25, 2011 cited in Appln No. 200510089514.X.
U.S. Official Action in U.S. Appl. No. 11/217,071 mailed Mar. 22, 2011.
U.S. Official Action in U.S. Appl. No. 12/163,784 mailed Mar. 14, 2011.
U.S. Appl. No. 13/102,633, filed May 6, 2011 entitled "Markup Based Extensibility for User Interfaces".
Seo et al, "Hangul Office 2000 Tutoring Book", Sep. 15, 2000, 16 pgs. (Cited in Korean Notice of Rejection May 17, 2011).
Office 2007, Microsoft, Released on Nov. 6, 2006, 23 pgs. (Cited in Jun. 9, 2011 OA).
Egypt Official Decision dated Mar. 14, 2011 cited in Appln No. 2005080371.
Malaysian Substantive Examination Adverse Report dated Mar. 15, 2011 cited in Appln No. PI 20053260.
Philippines Examiner's Action dated Apr. 12, 2011 cited in Appln No. 1-2005-00404.
Japanese Notice of Rejection dated May 6, 2011 cited in Appln. No. 2005-236089.
Japanese Notice of Rejection dated May 6, 2011 cited in Appln. No. 2005-236087.
Korean Notice of Rejection dated May 17, 2011 cited in Appln No. 10-2004-48176.
Chinese Second Office Action dated May 19, 2011 cited in Appln No. 200780020312.7.
U.S. Official Action dated Apr. 21, 2011 in U.S. Appl. No. 11/445,393.
U.S. Official Action dated Apr. 21, 2011 in U.S. Appl. No. 12/574,256.
U.S. Official Action dated May 12, 2011 in U.S. Appl. No. 12/753,923.
U.S. Official Action dated May 19, 2011 in U.S. Appl. No. 11/430,562.
U.S. Official Action dated May 19, 2011 in U.S. Appl. No. 10/851,506.

U.S. Official Action dated Jun. 9, 2011 in U.S. Appl. No. 12/464,584.
"The New "Office 2007" User Interface", Microsoft Corporation © 2005, 32 pgs.
"The New Look in Office 12 / Office 2007", OFFICE Watch, posted Sep. 20, 2005, 9 pgs.
Atwood, "Sometime a Word is Worth a Thousand Icons", Coding Horror, Feb. 22, 2006, 9 pgs.
PCT Written Opinion and Search Report dated Nov. 29, 2010 cited in International Application No. PCT/US2010/034277, 10 pgs.
Mexican Office Action dated Jan. 6, 2011 cited in Application No. PA/a/2005/008354, 26 pgs.
Mexican Office Action dated Mar. 31, 2011 cited in Application No. PA/a/2005/008351, 46 pgs.
Mexican Office Action dated Mar. 31, 2011 cited in Application No. PA/a/2005/008349, 40 pgs.
Mexican Office Action dated Mar. 31, 2011 cited in Application No. PA/a/2005/008350, 40 pgs.
Russian Office Action dated Jun. 14, 2011 cited in Application No. 2008147090, 2 pgs.
Chinese Third Office Action dated Jun. 21, 2011 cited in Application No. 200680030421.2, 8 pgs.
U.S. Official Action dated Jul. 8, 2011 in U.S. Appl. No. 11/401,470, 16 pgs.
U.S. Official Action dated Jul. 8, 2011 in U.S. Appl. No. 12/163,784, 23 pgs.
U.S. Official Action dated Jun. 7, 2011 in U.S. Appl. No. 12/059,644, 42 pgs.
The Discussion Board Component of Blackboard: An Instructor's Guide; Aug. 2004; 23 pgs. (cited in Feb. 1, 2011 OA).
Hock, "Yahoo! to the Max"; May 10, 2005; 5 excerpted pgs. (cited in Feb. 1, 2011 OA).
Homeworking Forum; archived Dec. 6, 2004; 11 pgs. (Cited in Jun. 7, 2011 OA).
Venolia et al., Gina Danielle, Supporting Email Workflow, revised Dec. 2001; 11 pgs. (cited in OA Jan. 6, 2011).
Mock et al., "An Experimental Framework for Email Categorization and Management", Sep. 9-12, 2001, 3 pgs. (Search Rpt).
Yang, "Email Categorization Using Fast Machine Learning Algorithms", 2002, 8 pgs. (Search Rpt).
Islam et al., "Email Categorization Using Multi Stage Classification Technique", 2007, 3 pgs. (Search Rpt).
"Preview Pane in Conversation: 4 pane view", 2005, Zinbra Inc., 3 pgs. (Search Rpt).
"Reading Pane in Conversation View", retrieved at <<http://www.zimbra.com/forums/users/5918-reading-paneconversation-view.html>>, 5 pgs. (Search Rpt).
New Zealand Office Action dated Oct. 14, 2009 cited in NZ Application No. 566363.
European Office Action dated Jun. 15, 2010 cited in EP Application No. 06814358.5.
Russian Office Action dated Jul. 26, 2010 cited in RU Application No. 2008109034, w/translation.
Chinese Office Action dated Nov. 11, 2010 cited in CN Application No. 200680032789.2, w/translation.
Russian Office Action dated Nov. 12, 2010 cited in Application No. 2008109034, w/translation.
Australian OA dated Jan. 17, 2011 cited in Application No. 2006287408.
Chinese Second Office Action dated Apr. 7, 2011 cited in Application No. 200680032789.2, w/translation.
Japanese Office Action dated Jun. 10, 2011 cited in JP Application No. 2008-530229, w/translation.
Chinese Second Office Action dated Jul. 14, 2011 cited in Appln No. 20680018095.3.
Chinese Decision on Rejection dated Jul. 21, 2011 cited in Appln No. 20068032789.2.
Korean Notice of Preliminary Rejection dated Jul. 22, 2011 cited in Appln No. 10-2005-0058160.
Japanese Notice of Rejection dated Aug. 12, 2011 cited in Appln No. 2005-184990.
U.S. Official Action dated Oct. 5, 2009 in U.S. Appl. No. 11/332,822.
U.S. Official Action dated Apr. 23, 2010 in U.S. Appl. No. 12/144,642.

U.S. Official Action dated Jun. 25, 2010 in U.S. Appl. No. 11/332,822.
U.S. Official Action dated Sep. 16, 2010 in U.S. Appl. No. 12/144,642.
U.S. Official Action dated Jan. 6, 2011 in U.S. Appl. No. 12/142,927.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Jun. 7, 2011 in U.S. Appl. No. 11/332,822.
U.S. Official Action dated Jul. 8, 2011 in U.S. Appl. No. 11/401,470.
U.S. Official Action dated Jul. 8, 2011 in U.S. Appl. No. 12/163,784.
U.S. Official Action dated Aug. 3, 2011 in U.S. Appl. No. 12/142,927.
Mexican Office Action dated May 26, 2011 cited in Appln. No. MX/a/2009/004151.
Korean Preliminary Rejection dated Aug. 23, 2011 cited in Appln. No. 10-2005-0067236.
Korean Preliminary Rejection dated Aug. 23, 2011 cited in Appln. No. 10-2005-0067411.
Korean Preliminary Rejection dated Aug. 29, 2011 cited in Appln. No. 10-2005-0066460.
Australian Office Action dated Aug. 31, 2011 cited in Appln. No. 2007255043.
3rd Official Notice, Mailing No. 134028, dated Sep. 16, 2001 cited in Appln. No. PH1707009.
4th Official Notice, Mailing No. 134052, dated Sep. 16, 2001 cited in Appln. No. PH1707009.
U.S. Official Action dated Sep. 13, 2011 in U.S. Appl. No. 12/372,386.
U.S. Official Action dated Sep. 14, 2011 in U.S. Appl. No. 12/163,758.
Mexican Office Action dated Oct. 3, 2011 cited in Appln. No. MX/a/2008/014849, 10 pages.
Chinese Office Action dated Aug. 26, 2011 cited in Appln No. 200980112454.5, 9 pages.
U.S. Official Action dated Oct. 25, 2011 in U.S. Appl. No. 12/144,642, 45 pages.
U.S. Official Action dated Nov. 2, 2011 in U.S. Appl. No. 10/836,154, 26 pages.
Dr. Dobb's Journal; "Windows 95 Common Controls"; May 1, 1995; 12 pgs. (cited in Dec. 6, 2011 EP Search Rpt, all pages.
Korean Notice of Rejection dated Nov. 3, 2011 cited in Appln No. 10-2005-0067257, all pages.
Japanese Notice of Rejection dated Nov. 4, 2011 cited in Appln No. 2008-513476, all pages.
Japanese Notice of Rejection dated Nov. 11, 2011 cited in Appln. No. 2008-530229, all pages.
Chinese Office Action dated Nov. 18, 2011 cited in Appln. No. 200910148820.4, all pages.
Chinese Office Action dated Nov. 29, 2011 cited in Appln. No. 200980124383.0, all pages.
Chinese Third Office Action dated Dec. 5, 2011 cited in Appln. No. 200680018095.3, all pages.
European Search Report dated Dec. 6, 2011 cited in Appln No. 06803424.8, all pages.
Mexican Office Action Summary dated Sep. 22, 2011 cited in Appln. No. MX/a/2008/003342, 10 pages.
Japanese Notice of Rejection dated Dec. 16, 2011 cited in Appln No. 2008-529218, 3 pages.
U.S. Official Action dated Jan. 12, 2012 in U.S. Appl. No. 11/782,059, 45 pages.
U.S. Official Action dated Jan. 17, 2012 in U.S. Appl. No. 11/217,071, 24 pages.
U.S. Official Action dated Jan. 19, 2012 in U.S. Appl. No. 11/814,084, 35 pages.
U.S. Official Action dated Jan. 25, 2012 in U.S. Appl. No. 12/059,644, 16 pages.
Korean Notice of Rejection dated Jan. 30, 2012 cited in Appln No. 10-2004-0048176, 5 pages.
Japanese Notice of Rejection dated Feb. 3, 2012 cited in Appln No. 2008-530218, 6 pages.
U.S. Official Action dated Jan. 26, 2012 in U.S. Appl. No. 12/464,584, 32 pages.
Malaysian Substantive Examination Adverse Report dated Jan. 31, 2012 cited in Appln No. PI 20053258, 3 pages.

Malaysian Substantive Examination Adverse Report dated Jan. 31, 2012 cited in Appln No. PI 20053259, 3 pages.
European Search Report dated Feb. 23, 2012 cited in Appln No. 05107153.8, 8 pages.
Chinese Office Action dated Feb. 29, 2012 cited in Appln No. 200980124664.9, 9 pages.
Chinese Decision on Rejection dated Mar. 7, 2012 cited in Appln No. 200780020312.7, 5 pages.
Chinese Second Office Action dated Mar. 9, 2012 cited in Appln No. 200980124383.0, 10 pages.
Japanese Notice of Final Rejection dated Mar. 9, 2012 cited in Appln No. 2008-513476, 2 pages.
U.S. Official Action dated Feb. 27, 2012 in U.S. Appl. No. 12/372,386, 41 pages.
U.S. Official Action dated Mar. 14, 2012 in U.S. Appl. No. 12/142,927, 49 pages.
International Search Report dated Feb. 9, 2012 cited in Appln No. PCT/US2011/037458, 9 pages.
U.S. Appl. No. 13/437,031, filed Apr. 2, 2012 entitled "Automatic Grouping of Electronic Mail", all pages.
U.S. Appl. No. 13/427,939, filed Mar. 23, 2012 entitled "An Improved User Interface for Displaying a Gallery of Formatting Options Applicable to a Selected Object", all pages.
Douglas et al., "Dynamic Popup Menu Titles"; IP.com Journal, IP.com Inc., West Henrietta, NY, Aug. 1, 1992, 2 pgs. (cited in Feb. 28, 2012 Search Report).
Haden et al.; "Scrollable Popup Menu with Selection Tracking Display of Graphical Objects"; IP.com Journal, IP.com Inc., West Henrietta, NY, Aug. 1, 1994, 6 pgs. (cited in Feb. 28, 2012 Search Report).
"Index Card Metaphor for Multiple Property Sheets Associated with a Given Object"; IBM Technical Disclosure Bulletin, International Business Machines Corp., vol. 33, No. 3A, Aug. 1, 1990, 2 pgs. (cited in Feb. 15, 2012 Search Report).
"Menu Selection Method for Related Attributes"; IBM Technical Disclosure Bulletin, International Business Machines Corp., vol. 33, No. 6B, Nov. 1990, 3 pgs. (cited in Feb. 15, 2012 Search Report).
Ribbons; Microsoft; © 2012 Microsoft; http://msdn.microsoft.com/en-us/library/windows/desktop/cc872782.aspx; 45 pgs. (Cited in Apr. 10, 2012 NOA).
AutoCAD 2011—Customization Guide; Feb. 2010; Autodesk, Inc.; http://images.autodesk.com/adskffiles/acad_acg.pdf; 554 pgs. (Cited in Apr. 10, 2012 NOA).
Chinese Decision on Reexamination dated Feb. 1, 2012 cited in Appln No. 200510089514.X, 23 pages.
European Search Report dated Feb. 15, 2012 cited in Appln No. 05107157.9, 8 pages.
European Search Report dated Feb. 28, 2012 cited in Appln No. 05107184.3, 8 pages.
Taiwan Search Report dated Mar. 14, 2012 cited in Appln No. 094123420, 7 pages.
European Search Report dated Mar. 16, 2012 cited in Appln No. 05107186.6, 8 pages.
Taiwan Notice of Allowance dated Mar. 29, 2012 cited in Appln No. 10120306600, 6 pages.
Chilean Office Action dated Mar. 29, 2012 cited in Appln No. 1560-2010, 5 pages.
Chilean Office Action dated Mar. 29, 2012 cited in Appln No. 1559-2010, 5 pages.
India First Examination Report dated Mar. 30, 2012 cited in Appln No. 1817/DEL/2005, 2 pages.
Japanese Notice of Allowance dated Apr. 11, 2012 cited in Appln No. 2008-530229, 6 pages.
U.S. Official Action dated Apr. 5, 2012 in U.S. Appl. No. 12/163,758, 28 pages.
U.S. Official Action dated Apr. 19, 2012 in U.S. Appl. No. 13/102,633, 90 pages.
U.S. Appl. No. 13/464,572, filed May 4, 2012 entitled "Accessing an Out-Space User Interface for a Document Editor Program".
Chinese Fourth Office Action dated Apr. 27, 2012 cited in Appln No. 200680018095.3.
U.S. Official Action dated Apr. 26, 2012 in U.S. Appl. No. 11/782,059.
U.S. Official Action dated May 8, 2012 in U.S. Appl. No. 12/144,642.

* cited by examiner

MARKUP BASED EXTENSIBILITY FOR USER INTERFACES

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects. Modern database applications allow users to store, organize and exchange large amounts of data.

Most software applications provide one or more graphical user interfaces through which a user enters and edits data and from which the user accesses and utilizes various functionalities of the associated software application. A typical user interface includes a work area in which data may be entered, edited, and reviewed. Additionally, user interfaces typically include one or more buttons and/or controls operative for selecting the functionalities provided by the associated software application. For example, buttons or controls may be provided for printing or saving a document, buttons or controls may be provided for applying formatting properties to aspects of a document, and the like.

Often, a third party software developer creates a software add-in that may be added to an existing application for providing functionality not available from the existing application. For example, an add-in software application may provide a feature to a word processing application for adding specialized footnotes or endnotes to a document. Typically, in addition to providing additional functionality, the add-in application provides one or more new user interface components to the existing application user interfaces, such as a new toolbar, button(s), or other control(s), for accessing the additional functionality.

According to one prior method, third party developers are given access to an object model associated with an application's existing user interfaces for allowing customization of the existing user interfaces according to the needs of third party add-in software. Unfortunately, such prior methods have shortcomings because the object models for given user interfaces are not typically designed around common uses across a variety of different applications, for example, word processing applications, spreadsheet applications, slide presentation applications, and the like, and often such applications exhibit different and perhaps undesirable behaviors in association with custom user interface components.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing methods, systems and computer products for exposing a software application user interface programming to third party application add-in developers to allow modification of existing application user interfaces to include new or modified user interface components associated with add-in applications. According to aspects of the invention, an Extensible Markup Language (XML) schema that governs XML programming that may be used to modify a given user interface is exposed to third party developers to allow them to specify changes to the user interface programming according the associated XML schema. For example, if a third party developer desires to add a new button or control to an existing user interface that would be linked to a functionality of an add-in application, the third party developer can modify the existing programming of the user interface according to the grammatical and syntax rules dictated by the associated XML schema. According to an aspect of the invention, XML or other suitable representations of user interface modifications do not necessarily follow the same programming language as the original user interface. Moreover, the original built-in user interface programming may be very complex, and the XML schema exposed according to the present invention may be only a subset of the overall programming for the original user interface. When the modified programming is executed by the host software application, the user interface is rendered with the changes made by the third party developer. For example, if the programming of the user interface is modified to add a new button, then the new button will be rendered in the user interface in response to the modification to the programming for the user interface so long as the modification is done according to the associated XML schema.

According to aspects of the invention, new user interface components may be added to existing user interfaces and may be linked to associated add-in functionality. The sizes of new user interface components may be automatically scaled to fit available display space as a window in which the user interface is displayed is reduced or enlarged. In addition, according to aspects of the invention, end users of a modified user interface may remove added user interface components if desired. If a particular software add-in is un-installed, the added or modified user interface components associated with the un-installed add-in are not shown in the subsequently rendered user interface.

According to other aspects of the invention, existing user interface components such as buttons or controls may be disabled or may be removed altogether by third parties. In addition, existing user interface components may be repurposed so that the repurposed components exhibit different behaviors when selected.

According to other aspects of the invention, by accessing the schema exposed for modifying an existing user interface, third party contextual user interfaces and contextual user interface buttons or controls may be added to existing user interfaces that are exposed in the existing user interfaces when a document object associated with the added contextual user interface is selected. In addition, controls, which when selected cause the application of one or more add-in functionalities to a selected object, may be added to a gallery or collection of controls that are deployed in the existing user interface for applying one or more functionalities of the application to a selected object.

According to other aspects of the invention, the XML schema may be utilized to build start-from-scratch user interfaces that are customized according to the needs of a third party add-in to the associated software application. When such a start-from-scratch user interface solution is rendered, the resulting user interface may bear little resemblance to the application user interface normally exposed to users for the associated software application. That is, when the associated document is launched, a customized user interface for providing the user functionality to the launched document is rendered according to the customized user interface provided for the document.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to methods, systems, and computer products for exposing the programming of an application user interface to allow modification of an associated user interface to include adding, removing, disabling, enabling and repurposing new or existing user interface components. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
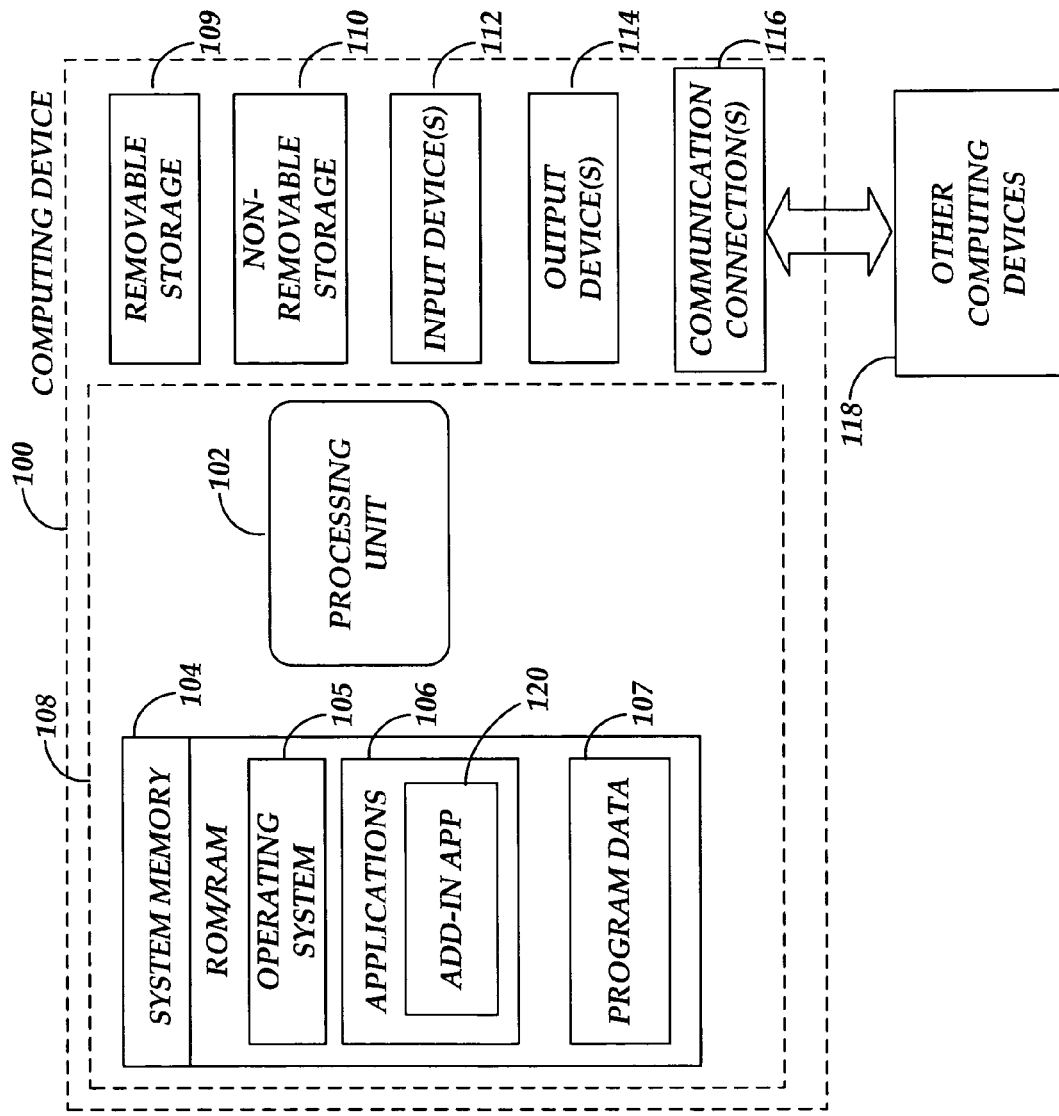
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106, 120 and may include program data 107. This basic configuration is illustrated in FIG. 1 by those components within dashed line 108.

According to embodiments of the invention, the application 106 may comprise many types of programs, such as an electronic mail program, a calendaring program, an Internet browsing program, and the like. An example of such programs is OUTLOOK® manufactured by MICROSOFT CORPORATION. The application 106 may also comprise a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. The add-in software application 120 may comprise any software application that may be added to the applications 106 for enhancing or providing additional functionality to the applications 106 as described herein. In addition, an add-in software application, as described herein, may include document-based software solutions, for example, a spreadsheet document that includes attached toolbars, or a word processing document that contains a macro or other code that adds a toolbar with buttons or controls.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
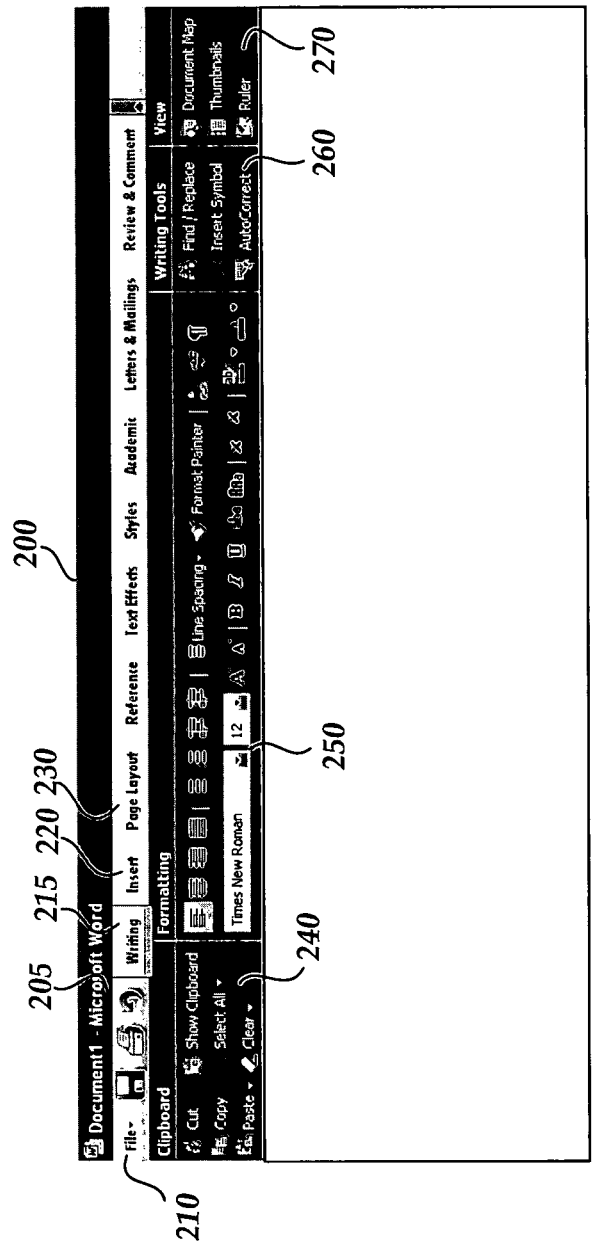
FIG. 2 is a computer screen display showing an example user interface that may be modified according to embodiments of the present invention.

FIG. 2 is an illustration of a computer screen display showing an example user interface that may be modified according to embodiments of the present invention. As should be understood by those skilled in the art, the example user interface illustrated in FIG. 2 is for purposes of example and illustration only. That is, embodiments of the present invention may be utilized for a vast array of different user interfaces having different user interface components and different user interface layouts. Thus, the description of the present invention in terms of the example user interface illustrated in FIG. 2 should not be taken as restrictive or limiting in any way of the claimed invention.

The user interface illustrated in FIG. 2 includes a ribbon-shaped user interface for displaying selectable controls associated with task-based functionality available under a given software application, such as the software application 106 illustrated in FIG. 1. A first section 210 of the user interface 200 includes generic selectable controls for functionality not associated with a particular task, such as word processing versus spreadsheet data analysis. For example, the section 210 includes selectable controls for general file commands such as "file open," "file save" and "print." According to one embodiment of the present invention, the selectable controls included in the first section 210 are controls that may be utilized by a variety of software applications, for example, a word processing application, spreadsheet application, slide presentation application, and the like. That is, the selectable controls included in the first section 210 may be controls that are generally found and used across a number of different software applications.

Adjacent to the first section 210 of the user interface 200 is a task-based tab section. The tab section includes selectable tabs associated with task-based functionality provided by a given software application. For purposes of example, the task-based tabs illustrated in FIG. 2 are associated with tasks that may be performed using a word processing application. For example, a "Writing" tab 215 is associated with functionality that may be utilized for performing writing tasks. An "Insert" tab 220 is associated with functionality associated with performing insert operations or tasks. A "Page Layout" tab 230 is associated with functionality provided by the associated application for performing or editing page layout attributes of a given document.

As should be appreciated, many other task-based tabs or selectable controls may be added to the tab section of the user interface for calling functionality associated with other tasks. For example, task tabs may be added for text effects, document styles, review and comment, and the like. And, as described above, the user interface 200 may be utilized for a variety of different software applications. For example, if the user interface 200 is utilized for a slide presentation application, tabs contained in the tab section may include such tabs as "Create Slides," "Insert," "Format," "Drawing Effects," and the like associated with a variety of tasks that may be performed by a slide presentation application. Similarly, tabs that may be utilized in the tab section of the user interface 200 for a spreadsheet application 140 may include such tabs as "Data" or "Data Entry," "Lists," "Pivot Tables," "Analysis," "Formulas," "Pages and Printing," and the like associated with tasks that may be performed using a spreadsheet application.

Immediately beneath the generic controls section 210 and the task-based tab section is a selectable functionality control section for displaying selectable functionality controls associated with a selected tab 215, 220, 230 from the task-based tab section. According to embodiments of the present invention, when a particular tab, such as the "Writing" tab 215 is selected, selectable functionality available from the associated software application for performing the selected task, for example, a writing task, is displayed in logical groupings. For example, referring to FIG. 2, a first logical grouping 240 is displayed under a heading "Clipboard." According to embodiments of the present invention, the clipboard section 240 includes selectable functionality controls logically grouped together and associated with clipboard actions underneath the general task of writing.

Selectable controls presented in the "Formatting" section 250 may include such selectable controls as text justification, text type, font size, line spacing, boldface, italics, underline, etc. Accordingly, functionalities associated with formatting operations are logically grouped together underneath the overall task of "Writing." A third logical grouping 260 is presented under the heading "Writing Tools." The writing tools section 260 includes such writing tools as find/replace, autocorrect, etc. According to embodiments of the present invention, upon selection of a different task-based tab from the tab section, a different set of selectable functionality controls in different logical groupings is presented in the user interface 200 associated with the selected task-based tab. For example, if the "Insert" task tab 220 is selected, the selectable functionality controls presented in the user interface 200 are changed from those illustrated in FIG. 2 to include selectable functionality controls associated with the insert task.

As described herein, often third party application or solution developers provide software applications or modules that may be added to an existing application for adding functionality to the existing application. For example, a software developer may produce a software application or module that may be added to a word processing application for adding additional formatting properties or other functionalities that are not available in the host application (e.g., word processing application, spreadsheet application, slide presentation application, etc.), or the third party add-in application or module may modify or enhance functionalities already provided by the host application. As described herein, embodiments of the present invention provide access to the programming associated with one or more user interfaces of a host application to allow a third party application developer to modify the user interfaces of the host application to provide for user interface components that are applicable to added or modified functionality provided by a given add-in application or module.

As will be appreciated, embodiments of the present invention are not limited to use in association with add-in applications. For example, a third party developer may utilize aspects of the invention to modify components of an application user interface without regard to added functionality. For example, a third party may desire to change the behavior of a user interface component apart from any added functionality as described herein.

Figure 3:
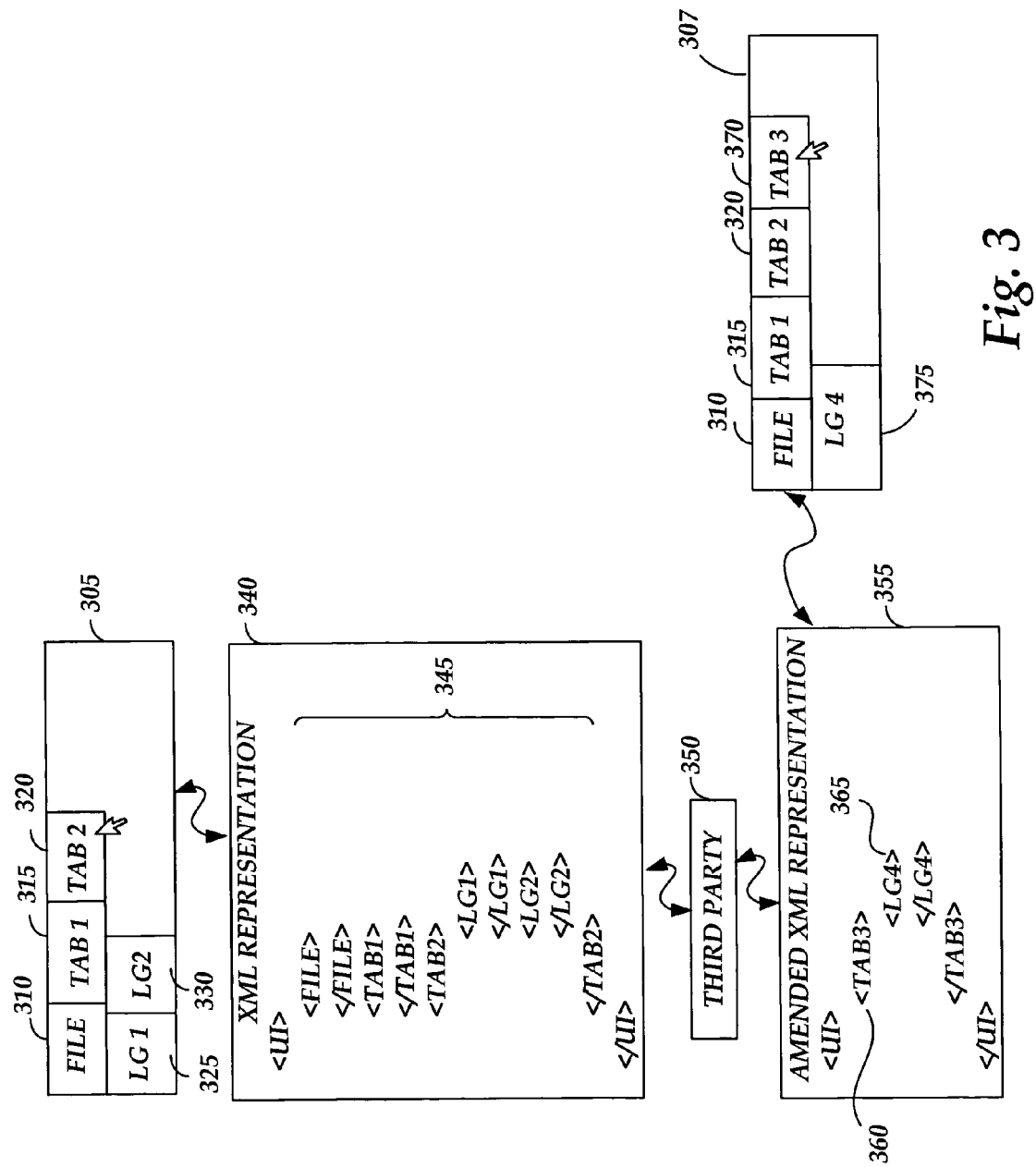
FIG. 3 is a simplified block diagram showing a relationship between an example user interface and an XML representation of the example user interface that may be amended for modifying the example user interface according to embodiments of the present invention.

FIG. 3 is a simplified block diagram showing a relationship between an example user interface and an XML representation of the example user interface that may be amended for modifying the example user interface according to embodiments of the present invention. Referring to FIG. 3, a user interface 305 of a host application 106, for example, a word processing application, spreadsheet application, slide presentation application, and the like, is illustrated having a File command button 310, a Tab1 button 315, and a Tab2 button 320. As described above with reference to FIG. 2, the example user interface 305, illustrated in FIG. 3, is for purposes of example only and is not limiting of the vast number of buttons, controls, or other selectable functionalities that may be provided in a given user interface according to embodiments of the present invention. The example user interface 305 includes a first logical grouping of buttons or controls 325 and a second logical grouping of buttons or controls 330. According the example user interface 305, the Tab2 button 320 has been selected for providing the first and second logical groupings of buttons or controls 325, 330.

According to embodiments of the present invention, the user interface 305 is programmed and structured according to a markup language such as the Extensible Markup Language (XML). As should be understood, other languages suitable for programming and structuring a user interface 305 as described herein may be utilized. As shown in FIG. 3, an XML file 340 is illustrated for providing the XML programming and structure for the example user interface 305. For example, a <UI> root tag is provided having three children tags <FILE>, <TAB1> and <TAB2>. The <TAB2> tag includes two children tags including the <LG1> tag (first logical grouping of buttons or controls) and the <LG2> tag (second logical grouping of buttons or controls). As should be understood, XML file 340 is not intended to illustrate a well-formed XML file, but is provided for purposes of illustration only.

An XML schema document or file (not shown) is provided by the developers of the host application that provides the XML grammatical and syntax rules applicable to XML used for programming and structuring the user interface 305, for example, for adding, removing or otherwise modifying new or existing tags to the XML file 340. For example, the XML schema may dictate the types and names of XML tags that may be added to the XML file 340. For example, the XML schema associated with the user interface 305 may require that each tab tag must include at least one logical grouping child tag. For another example, the XML schema associated with the user interface 305 may dictate that certain XML in the XML file 340 may not be altered, for example, logical grouping tags under a given tab tag of the original user interface 305 may not be altered by a third party.

For another example, the XML schema may dictate certain formatting properties that may or may not be applied to the user interface 305 via changes to the XML file 340. The entire XML schema file 340 and the entire associated XML schema file may be exposed to third party developers. Alternatively, only a subset of the XML file 340 associated with the host application user interface 305 and only a subset of the associated XML schema file may be exposed to third party developers for allowing them to make a limited number and limited types of changes to the host application user interface 305.

The XML file 340 for the host application user interface 305 and the associated XML schema file are exposed to a third party 350 for allowing the third party 350 to make changes to the XML file 340 according to the grammatical and syntax rules provided by the associated XML schema file for modifying the user interface 305, as described herein. For example, the third party 350 may provide a software application add-in that provides an additional functionality not presently available in the host application. For example, the third party may desire to add a third tab button to the user interface 305 which when selected provides an additional logical grouping of buttons or controls underneath the added third tab button for providing buttons and/or controls for selecting functionality provided by the third party application add-in. For example, a third party application add-in may add a functionality for providing specialized endnotes or footnotes to a word processing application. In order to expose the functionality provided by the add-in to users, the third party developer may need to provide an additional tab in the user interface 305, for example, a "footnotes/endnotes" tab. In addition to adding the "footnotes/endnotes" tab, the third party developer may wish to add an additional logical grouping of buttons or controls that are displayed in the user interface 305 upon selection of the "footnotes/endnotes" tab which will provide buttons and/or controls for selecting various aspects of the added footnotes and endnotes functionality. As should be appreciated, existing buttons or controls may similarly be removed from the user interface 305 by modifying the associated XML file 340.

According to one embodiment, the markup exposed to the third party developer via the XML file 340 is of an incremental nature so that the third party developer is provided limited ability to modify the host application user interface 305. Thus, according to one embodiment, the third party developer does not receive an XML file 340 allowing them to insert their own user interface components at any location. Instead, according to this embodiment, the XML file 340 and the associated schema exposed to the third party developer allow the third party developer to specify a desired location for a new user interface component, for example, insert new component after existing component ABC, and the host application then integrates the amended XML file with the overall XML file representing the host application user interface 305 for rendering the amended user interface 307.

According to one embodiment, the amended XML file 355 provided by each third party developer is identified by a unique XML namespace to prevent one third party application add-in from modifying user interface components supplied by or modified by another third party add-in. Alternatively, the third-party add in file 355 may be identified by other means, for example, by a globally unique identifier (GUID) or by a local filename identification.

Once the XML representation 340 of the host application user interface 305 is accessed by the third party 350, the third party 350 may amend the XML applied to the user interface 305 in accordance with the associated XML schema file for adding the desired buttons or controls to the user interface 305. The resulting amended XML file 355 illustrates changes made to the XML file 355 for the user interface 305. For example, referring to the amended XML file 355, the third party developer 350 has added a <TAB3> tag 360 and an <LG4> tab (fourth logical grouping of buttons and/or controls) 365. The XML file 355 illustrates the incremental nature of the modifications that may be made to the existing user interface according to embodiments of the present invention. That is, because the example modifications are directed to the addition of a new user interface tab (TAB3) and associated logical grouping of buttons or controls (LG4), the XML file 355 need only make the incremental change of adding the new tab and logical grouping to the existing user interface as opposed to making global changes to the exposed XML for the user interface 305.

Once the desired changes made to the XML file 340 are applied to the host user interface 305, an amended user interface 307 may be rendered, as illustrated in FIG. 3. Referring to the amended user interface 307, the added third tab 370 and the added fourth logical grouping of buttons and/or controls 375 are shown. Once the added tabs and logical grouping of buttons or controls are linked to the associated functionality of the third party application add-in, selection of those added tabs, buttons or controls causes execution of the associated added functionality. Thus, by gaining access to the exposed XML file and associated XML schema for the host application user interface, the third party application developer is able to modify the host application user interface 305 for providing required buttons and/or controls for selecting functionality of the associated add-in application.

The following is an excerpt of an example XML file that has been modified by or supplied by a third party developer for adding a "Data Analysis" button or control to the end of a tools menu where the "Data Analysis" button is to be inserted after a logical grouping of buttons or controls labeled as "Data Tools." As illustrated in the example XML, such XML syntax as <insertAfter> is dictated by the associated XML schema file for allowing the third party application developer to insert a button referred to as "Data Analysis" after a logical grouping of buttons or controls referred to as "GroupingData-Tools." As should be understood by those skilled in the art, the example XML that follows is for purposes of illustration only and is not limiting of the claimed invention.

```
<tab id="msoTcidDataTab">
  <chunk id="atpk:MyChunk" insertAfter="GroupingDataTools">
    <bigButton label="Data Analysis" onAction="atpk:dosomething" image="someImage">
  </chunk>
</tab>
```

Changes to the XML file 340 may be made by third party developers according to different methods. According to one embodiment, the XML file 340 and the associated schema may be accessed by a third party application developer at the application level. For example, a button or control may be provided in the user interface 305 for allowing the third party application developer to access the XML file 340 and the associated schema utilized for programming and structuring the user interface. As should be understood, the XML file 340 and the associated schema file may be provided through other means such as through a developer tool or developer application that may be utilized by the third party application developer for preparing modifications to the XML file 340 in accordance with the associated XML schema file for applying to the host application when the third party application add-in is loaded onto the host application.

According to another embodiment, the user interface 305 associated with a given host application may be customized on a document level. That is, a document-based user interface 305 may contain customizations made to the user interface particular to a given document. For example, a user may create a customized document, for example, a sales template document for use by hundreds or thousands of sales representatives of a large company. Because the document will be used by so many people, it may be desirable to a third party application developer to customize a user interface provided by the host application, for example, a spreadsheet application, so that customized buttons or controls are rendered in the user interface when the particular document is launched.

A file format for such a document-based solution may be utilized in which various functionalities and properties associated with the document exist as related components hosted in a container file. For example, the container file may contain one component representative of user entered data, another component representative of document structure, for example, template structure, another component representative of formatting properties applied to the document, another component representative of document-based user interfaces customized for the document, and so on. A third party application developer may enter such a document container and access the XML representation file and associated XML schema applicable to the user interface component of the document. Once the developer has accessed the XML file and the associated XML schema for the user interface 305, the developer may customize the user interface by modifying the XML in accordance with the associated XML schema, as described above.

According to another embodiment, the modified XML file 355 and the associated XML schema file may be attached as a resource to a component object model (COM) add-in supplied by the third party application developer for providing functionality of the add-in application. When the COM add-in is applied to the host application, for example, a word processing application, the modified XML file 355 is consumed by the host application for rendering the resulting modified user interface 307.

Referring back to FIG. 3, as described above, third party software application add-ins may be utilized for adding new user interface components to the existing user interface of a host application, for example, a word processing application, a spreadsheet application, a slide presentation application and the like. According to one embodiment of the present invention, a start-from-scratch mode is provided where the XML file 340 exposed to the third party application developer removes all but essential user interface components from the associated host application user interface. The associated XML schema then provides the third party application developer the ability to add back original user interface components, for example, the first tab 315, the second tab 320, and the logical grouping controls 325 and 330. In addition, the third party application developer may then add new user interface components according to the associated schema file.

According to this embodiment, a shortcut is provided for allowing the removal of all but essential user interface components from the host application user interface and for allowing the add-in developer to have a great deal of control over the customization of the user interface because the add-in developer is able to start with virtually a blank slate user interface from which to build the customized user interface. According to one embodiment, this shortcut is an XML attribute, which when set to "true," causes a removal of most or all original user interface components.

Some areas of a given host application user interface 305 and some components of the user interface may be restricted from access by add-in developers. That is, some areas of the host application user interface and some components may be specified such that third party add-in developers may not remove or otherwise modify those areas or components. For example, referring to the host application user interface 305 in FIG. 3, it may be desired that the file button 310 for providing certain functionalities across a variety of applications, for example, a word processing application, a spreadsheet application, a slide presentation application, and the like, should not be altered, removed or repurposed in any manner by a third party add-in developer. Thus, the file button 310 may be restricted from access by third party add-in developers. Likewise, once user interface components are added to a given user interface, those components may be designated as restricted to prevent additional third party add-in applications from making changes to those user interface components provided by a previous add-in.

According to one embodiment of the present invention, if a third party add-in application is un-installed from the host application, the customized XML file applied to the host application user interface for adding or otherwise modifying user interface components in association with the un-installed add-in application is parsed and changes to the host application user interface in association with the add-in application are disabled so that changes to the host application user interface are not rendered in the user interface when the associated add-in application is un-installed. Likewise, upon closing a document-based solution that modified the original graphical user interface, the graphical user interface is rendered such that changes to the graphical user interface associated with the modification to the XML representation are not rendered in the graphical user interface By accessing the XML file 340 representing the host application user interface 305, existing user interface components may be repurposed so that repurposed components subsequently exhibit different behaviors. For example, an existing user interface component may be enabled, disabled, or may be specified for being associated with a different application action. For example, a third party application developer may desire that a given button, for example, a "print" button in a host application user interface may only be utilized for printing a document according to a prescribed print setting associated with the third party application add-in. For another example, a given function button or control may be disabled from use where the function conflicts with the operation of a function added to the host application by an add-in application.

Figure 4:
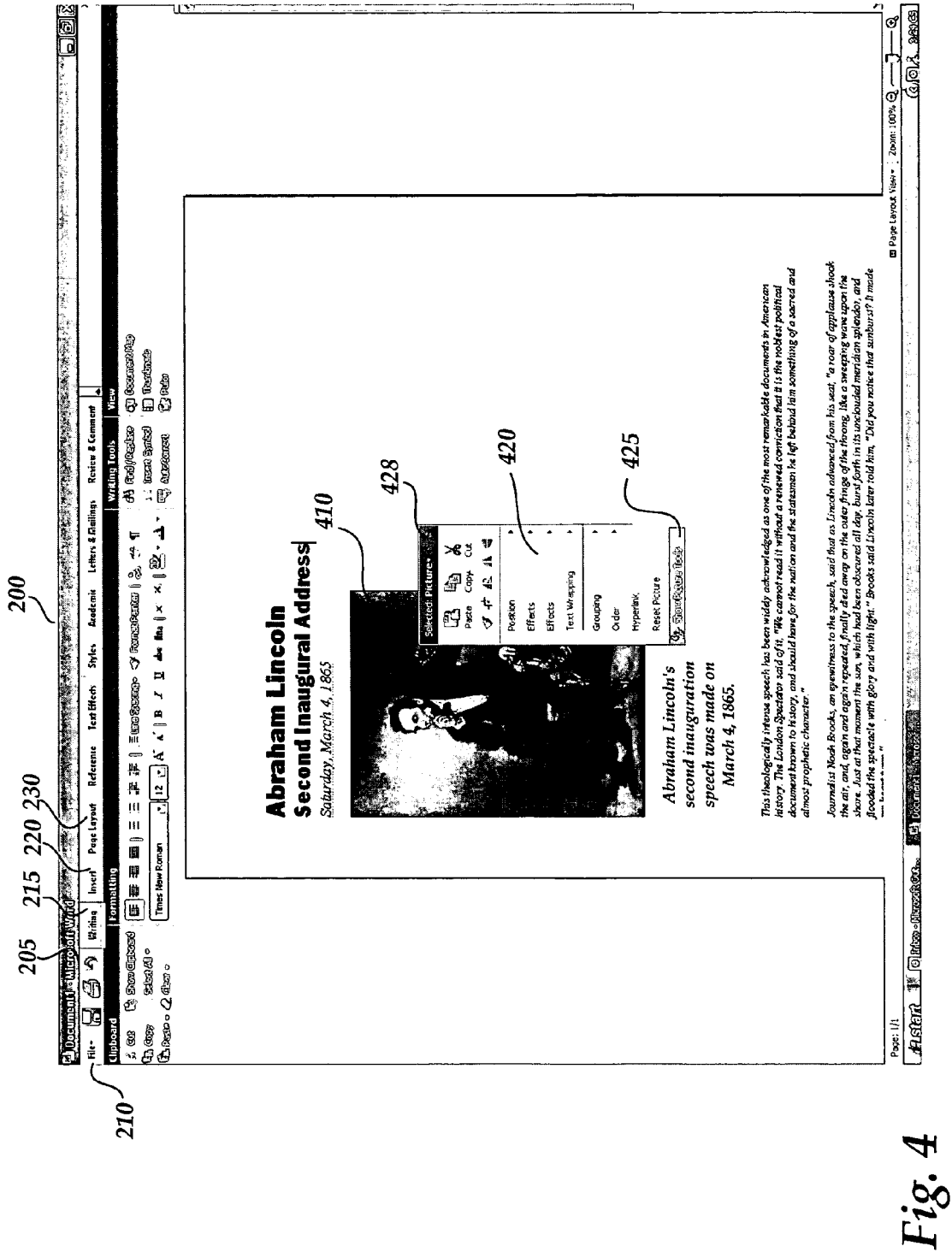
FIG. 4 is a computer screen display showing an example contextual user interface that may be modified according to embodiments of the present invention.

FIG. 4 is a computer screen display showing an example contextual user interface that may be modified according to embodiments of the present invention. As should be understood by those skilled in the art, the contextual user interface illustrated in FIG. 4 is for purposes of example only and is not limiting of the many different layouts and types of content that may be applied to and included in a contextual user interface that may be provided in association with a selected document object. Thus, the contextual user interface illustrated in FIG. 4 is not limiting or restrictive of the claimed invention in any way. For example, the contextual user interface illustrated in FIG. 4, described below, is in the form of a user interface menu that deploys in association with a selected object. However, this embodiment of the present invention may be implemented in other forms such as the addition of buttons or controls, such as tabs, to an original user interface 305 that are deployed in the user interface upon the selection of an object in an electronic document.

Referring to FIG. 4, a document including an embedded picture object 410 is illustrated in a word processing application workspace. According to embodiments of the present invention, the context menu 420 may be launched adjacent to or near a selected object through a variety of methods, including but not limited to, selection of an given document object such as the example picture object 410. The context menu 420 includes selectable functionality controls that are relevant to editing the selected object in the selected document. That is, the context menu 420 is populated with one or more selectable functionality controls that may be utilized for editing a particular selected object in a selected document. For example, referring to the context menu 420 illustrated in FIG. 4, the context menu is launched in the context of a selected picture object 410. Accordingly, the selectable functionality controls, such as the paste control, copy control, position control, reset picture control, and the like provide functionality to a user for editing attributes of the selected picture object 410. As should be understood by those skilled in the art, if the context menu 420 is launched in the context of another type of object, then the selectable functionality controls populated in the context menu 420 will be related to the other type of object.

According to embodiments of the present invention, by exposing the XML file 340 and associated XML schema for the contextual user interface 420, third party developers may add or modify user interface content contained in the contextual user interface 420 for creating customized contextual user interface content and components associated with add-in functionality that may be applied to a selected document object. For example, referring to FIG. 4, a third party add-in application may provide additional functionality for modifying or formatting the picture object 410 over the functionality provided in the host application contextual user interface 420. As described above with reference to FIG. 3, the third party add-in developer may add, disable, repurpose or otherwise modify user interface components in the contextual user interface 420 in association with the third party application add-in. For example, if the add-in application provides an additional formatting functionality that may be utilized for picture objects 410, an additional formatting button or group of formatting buttons and/or controls may be added to the contextual user interface 420 which will be rendered in the contextual user interface 420 when the picture object 410 is selected for editing. As described above, instead of modifying the contextual user interface 420, new functionality controls, for example, new tabs may be added to a user interface 305 (illustrated in FIG. 3) that are deployed in the user interface 305 upon the selection of an associated object.

Alternatively, in addition to modifying an existing contextual user interface, a new contextual user interface may be added to the host application. For example, if a given add-in application adds one or more functionalities for use on a selected object, an XML file 340 and an associated XML schema may be exposed for creating a new contextual user interface for the associated add-in functions that will be launched in association with a selected object. According to this embodiment, a start-from-scratch XML file 340 may be provided as described above to allow the creation and deployment of a new contextual user interface 420.

Figure 5:
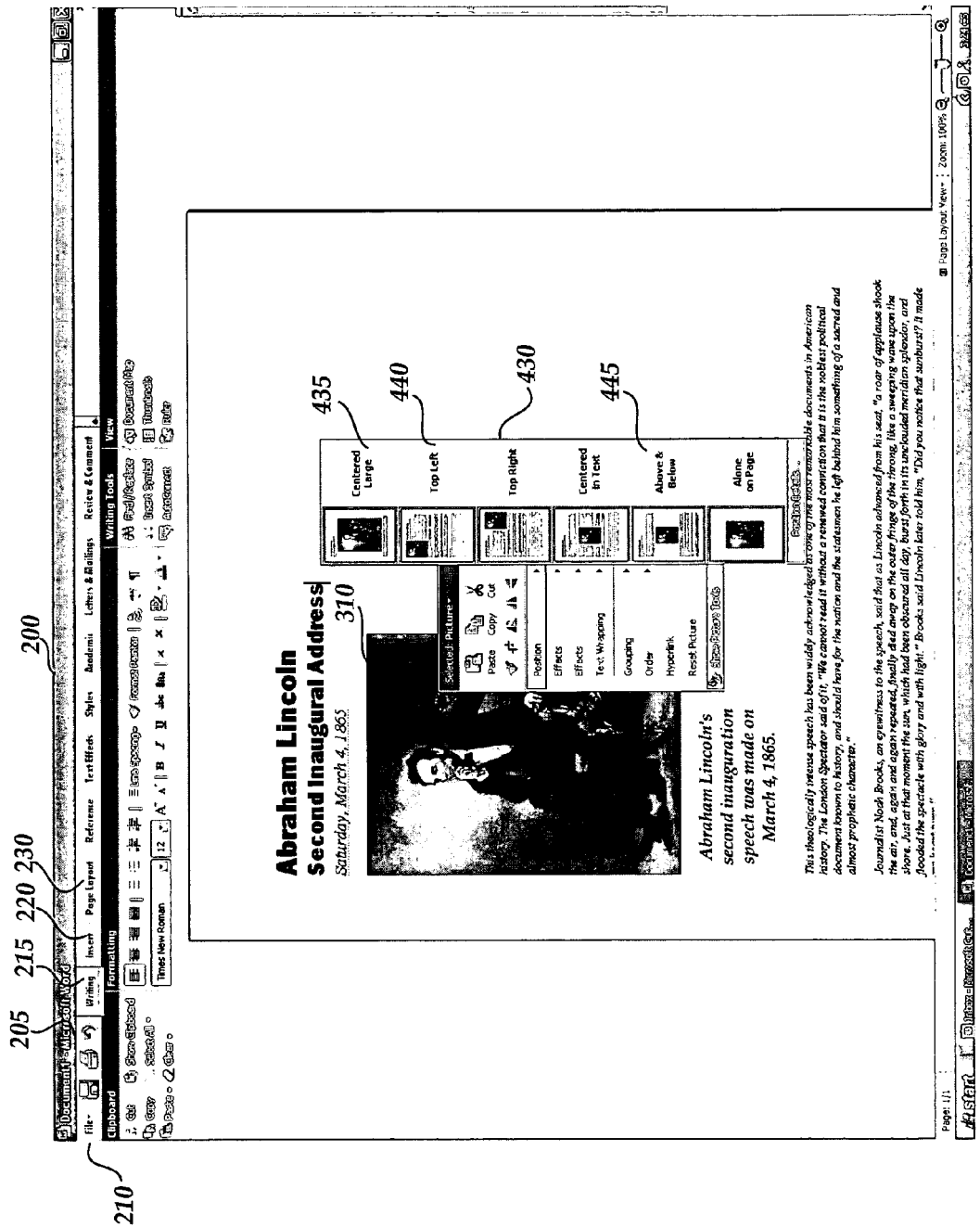
FIG. 5 is a computer screen display showing an example gallery of selectable controls user interface that may be modified according to embodiments of the present invention.

FIG. 5 illustrates a computer screen display showing an example gallery or collection of selectable controls 430 that may be modified according to embodiments of the present invention. As should be understood, the gallery of controls user interface 430 illustrated in FIG. 5 is for purposes of example only and is not restrictive of the different user interface layouts and different user interface content that may be applied to and included in a gallery of controls user interface, as described herein. Referring now to FIG. 5, a pop-out gallery of images is illustrated adjacent to the context menu 420. As should be understood such a gallery of controls may be deployed in other configurations. For example, a gallery of controls according to embodiments of the invention may be deployed in-line in the user interface 200, or the gallery may be deployed as a drop-down user interface under a selected button or control in the user interface 200. According to embodiments each control 435, 440, 445 contained in the gallery of controls represents one or more functionalities, for example, formatting functionalities that will be applied to a selected object if a given control in the gallery is selected.

A given add-in application may add functionality to the host application for providing additional functionalities (e.g., formatting properties) to a selected object and for which one or more additional controls may be desired in a host application gallery of controls. For example, referring to the example gallery of controls illustrated in FIG. 5, a third party add-in application may provide a formatting setting that automatically places the example picture object in the upper left hand corner of the example document and simultaneously applies a different formatting to the text contained in the document in which the picture object is included. If desired, the add-in application developer may modify the host application gallery of controls user interface 430 to provide an additional control showing the application of the add-in formatting properties to the selected document and picture object. As described above with reference to FIGS. 3 and 4, the add-in application author may specify the location in the gallery of controls at which the new control should be placed. For example, the add-in developer may specify that the new control should be inserted after the "Top Left" control 440.

In addition to modifying an existing gallery of controls user interface, a new gallery of controls user interface 430 may be added to the host application. For example, if a given add-in application adds one or more functionalities for use on a selected object, an XML file 340 and an associated XML schema may be exposed for creating a new gallery of controls user interface for the associated add-in functions that will be launched in association with a selected object. According to this embodiment, a start-from-scratch XML file 340 may be provided as described above to allow the creation and deployment of a new contextual user interface 420.

After user interface components are added to the host application user interface as described above with reference to FIGS. 3, 4, and 5, according to one embodiment of the present invention, the host application may automatically scale the sizes of the added user interface components as display space for the modified user interface is reduced or enlarged. For example, if a logical grouping of buttons or controls is added to a host application user interface, and the logical grouping of buttons or controls contains three large buttons associated with add-in functionality, the host application may automatically scale the displayed buttons if the window size containing the user interface is reduced. For example, if the window size containing the user interface is reduced such that the three large example buttons may no longer be displayed without crowding other user interface components, the three large buttons may be replaced with three smaller versions of the three large buttons. If the window size is further reduced, the smaller versions of the three buttons may be removed altogether, and a small text identification for the three functionalities associated with the three buttons may be utilized in place of the three large buttons.

Customized user interface components may be refreshed automatically by the host application when conditions affecting the customized user interface components change. For example, if a customized user interface component is added to a host application user interface 305 that provides a logo or picture associated with a given type of information (first data), the logo or picture may be disabled and automatically refreshed when associated information or data changes. For example, an add-in weather application may provide a button or control to the host application user interface which when selected provides a weather forecast for a specified area. The button or control in the user interface may be decorated with a picture associated with the current weather, for example, a sunny picture for sunny weather, a cloudy picture for cloudy weather, and so on. According to this embodiment of the present invention, if the current weather condition changes such that the picture or logo provided for the added button or control is no longer applicable, the current picture or logo may be automatically disabled, and the button or control may be refreshed with a different picture or logo that is applicable to the current information, for example, the current weather conditions.

According to embodiments, the host application keeps track of the identity of each added or modified user interface component relative to the software application add-in responsible for the added or modified user interface component. According to one embodiment, upon hovering over or focusing on an added user interface component, for example, hovering a mouse pointer over an added user interface component, a tool tip or other dialog may be presented to identify the software application add-in responsible for the added or modified user interface component and for directing the user to help content available for describing or providing other information about the software application add-in associated with the added or modified user interface component.

As described herein, software application user interface programming is exposed to allow modification of existing application user interfaces to include adding, removing, disabling, enabling and repurposing new or existing user interface components associated with add-in applications. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for modifying a graphical user interface, comprising:

displaying, by a computing device, a user interface for a host software application, the user interface containing a ribbon-shaped graphical user interface, the ribbon-shaped graphical user interface comprising a first tab, the first tab comprising a first logical group of controls, the first logical group of controls comprising a first set of one or more selectable controls for selecting one or more functionalities of the host software application, the ribbon-shaped graphical user interface including a gallery that provides a second set of one or more selectable controls, each of the selectable controls in the gallery comprising an image that represents a functionality that is applied if the selectable control is selected;

providing an Extensible Markup Language (XML) representation of the ribbon-shaped graphical user interface, the XML representation including a first XML element and a second XML element, the first XML element corresponding to the first tab of the ribbon-shaped graphical user interface, the second XML element corresponding to the first logical group of controls;

receiving an add-in application at the computing device, the add-in application providing one or more additional functionalities to the host software application;

receiving a modification to the XML representation, the modification adding a first add-in XML element to the XML representation, the first add-in XML element corresponding to an add-in control;

after receiving the modification to the XML representation, receiving, from a user, a selection of an object in a document displayed in the user interface; and exposing, by the computing device, the add-in control in the gallery in response to receiving the selection of the object, the add-in control comprising an image that represents a given functionality to be applied to the selected object if the add-in control is selected, the given functionality being one of the additional functionalities provided by the add-in application; and after closing a document-based solution that modified the ribbon-shaped graphical user interface, rendering the ribbon-shaped graphical user interface as the ribbon-shaped graphical user interface appeared prior to receiving the modification to the XML representation.

2. The method of claim 1,
wherein, after the computing device receives the modification to XML representation, the ribbon-shaped graphical user interface comprises a second tab, the second tab including one or more additional selectable controls associated with the one or more additional functionalities provided by the add-in application.

3. The method of claim 1, wherein after receiving the modification to the XML representation, the XML representation specifies a change to a behavior of a selectable control contained in the ribbon-shaped graphical user interface.

4. The method of claim 1,
wherein a given selectable control contained in the ribbon-shaped graphical user interface is enabled; and
wherein after receiving the modification to the XML representation, the given selectable control is disabled in the ribbon-shaped graphical user interface.

5. The method of claim 1, further comprising: after receiving the modification to the XML representation and upon receiving a focus on a selectable control contained in the ribbon-shaped graphical user interface, displaying an identification of the add-in application.

6. The method of claim 1, wherein a XML schema restricts a given selectable control contained in the ribbon-shaped graphical user interface from modification.

7. The method of claim 1,
wherein the ribbon-shaped graphical user interface includes a contextual user interface for displaying a third set of one or more selectable controls, the third set of selectable controls applicable to the selected object; and
wherein after receiving the modification to the XML representation, the ribbon-shaped graphical user interface comprises one or more additional selectable controls in the contextual user interface.

8. The method of claim 1, further comprising: after un-installation of the add-in application from the host software application, rendering the ribbon-shaped graphical user interface as the ribbon-shaped graphical user interface appeared prior to receiving the modification to the XML representation.

9. The method of claim 1, further comprising after receiving the modification to the XML representation, automatically scaling any user interface components added in the ribbon-shaped graphical user interface such that the any user interface components added in the ribbon-shaped graphical user interface are scaled to fit a display space in which the ribbon-shaped graphical user interface is displayed.

10. The method of claim 1,
wherein after receiving the modification to the XML representation, the ribbon-shaped graphical user interface includes a selectable control that was not in the ribbon-shaped graphical user interface prior to receiving the modification to the XML representation, the selectable control associated with one of the additional functionalities provided by the add-in application, wherein the selectable control is associated with a first data; and
upon receiving a change to the first data, refreshing the modified ribbon-shaped graphical user interface to automatically update the selectable control.

11. A computer storage medium containing computer executable instructions, which when executed by a computer, cause the computer to:

receive an add-in application for providing one or more additional functionalities to a host software application on the computer, wherein an initial XML file represents an initial version of a ribbon-shaped graphical user interface in a graphical user interface of the host software application, the initial version of the ribbon-shaped graphical user interface including a first tab, the first tab comprising a gallery containing a first set of selectable controls, each of the selectable controls in the gallery comprising an image that represents a functionality that is applied if the selectable control is selected;

receive an amended XML file, the amended XML file being an amended version of the initial XML file, the amended XML file representing a modified version of the ribbon-shaped graphical user interface, wherein in addition to the controls in the gallery in the initial version of the ribbon-shaped graphical user interface, the gallery in the modified version of the ribbon-shaped graphical user interface includes a contextual control;

after receiving the amended XML file, receive, from a user, a selection of an object in a document displayed in the graphical user interface; and expose the contextual control in the gallery in the modified version of the ribbon-shaped graphical user interface in response to receiving the selection of the selected object, the contextual control comprising an image that represents a given functionality to be applied to the selected object if the contextual control is selected, the given functionality being one of the additional functionalities provided by the add-in application; and after closing a document-based solution that modified the ribbon-shaped graphical user interface, rendering the ribbon-shaped graphical user interface as the ribbon-shaped graphical user interface appeared prior to receiving the modification to the XML representation.

12. The computer storage medium of claim 11, further comprising: upon receiving a focus on the contextual control, displaying in the modified version of the ribbon-shaped graphical user interface identification information about modifications to the initial version of the ribbon-shaped graphical user interface.

13. The computer storage medium of claim 11,
wherein the initial version of the ribbon-shaped graphical user interface includes a contextual user interface for displaying a second set of one or more selectable controls applicable to the selected object; and
wherein the contextual control is in the contextual user interface.

14. The computer storage medium of claim 11,
wherein prior to receiving the amended XML file, the gallery in the initial version of the ribbon-shaped graphical user interface provides a second set of one or more selectable controls for providing one or more functionalities to the selected object.

15. A method for modifying a graphical user interface, the method comprising:
displaying, by a computing device, a user interface for a host software application, the user interface including an initial version of a ribbon-shaped graphical user interface;
receiving, at the computing device, an add-in application that provides one or more additional functionalities to the host software application,
wherein an initial XML file represents the initial version of the ribbon-shaped graphical user interface, the initial version of the ribbon-shaped graphical user interface including a gallery that provides a first set of one or more selectable controls, each of the selectable controls in the gallery comprising an image that represents a functionality that is applied if the selectable control is selected,
receiving, at the computing device, an amended XML file, the amended XML file being an amended version of the initial XML file, the amended XML file representing a modified version of the ribbon-shaped graphical user interface, the amended XML file including a first add-in XML element, the first add-in XML element corresponding to a contextual control, wherein in addition to the selectable controls in the gallery in the initial version of the ribbon-shaped graphical user interface, the gallery in the modified version of the ribbon-shaped graphical user interface includes the contextual control;
after receiving the amended XML file, receiving, from a user, a selection of an object in a document in the user interface; and
exposing, by the computing device, the contextual control in the gallery in response to receiving the selection of the object, the contextual control comprising an image that represents a given functionality that is applied to the selected object if the contextual control is selected, the given functionality being one of the additional functionalities provided by the add-in application; and
in response to closing a document-based solution that modified the initial version of the ribbon-shaped graphical user interface, rendering the initial version of the ribbon-shaped graphical user interface instead of the modified version of the ribbon-shaped graphical user interface.

16. The method of claim 15, further comprising: receiving, at the computing device, a selection of the gallery.

17. The method of claim 15, further comprising:
disabling a second set of one or more selectable controls in the modified version of the ribbon-shaped graphical user interface.

18. A method for modifying a graphical user interface, the method comprising:
displaying, by a computing device, a user interface for a host software application, the user interface containing a ribbon-shaped graphical user interface, the ribbon-shaped graphical user interface comprising a first tab, the first tab comprising a first logical group of controls, the first logical group of controls comprising a first set of one or more selectable controls for selecting one or more functionalities of the host software application;
providing an Extensible Markup Language (XML) representation of the ribbon-shaped graphical user interface, the XML representation including a first XML element and a second XML element, the first XML element corresponding to the first tab of the ribbon-shaped graphical user interface, the second XML element corresponding to the first logical group of controls;
receiving an add-in application for providing one or more additional functionalities to the host software application;
receiving a modification to the XML representation, the modification adding a first add-in XML element to the XML representation, the first add-in XML element corresponding to an add-in control;
after receiving the modification to the XML representation, receiving, from a user, a selection an object in a document displayed in the user interface;
exposing, by the computing device, the add-in control in the ribbon-shaped graphical user interface in response to receiving the selection of the selected object;
applying a given functionality to the selected object in response to selection by the user of the add-in control, the given functionality being one of the additional functionalities provided by the add-in application; and
after un-installation of the add-in application from the host software application, rendering the ribbon-shaped graphical user interface as the ribbon-shaped graphical user interface appeared prior to receiving the modification to the XML representation; and
after closing a document-based solution that modified the ribbon-shaped graphical user interface, rendering the ribbon-shaped graphical user interface as the ribbon-shaped graphical user interface appeared before opening the document-based solution.

19. The method of claim 18,
wherein after receiving the modification, the ribbon-shaped graphical user interface comprises a second tab, the second tab containing one or more additional selectable controls associated with the one or more additional functionalities provided by the add-in application.

20. The method of claim 18, further comprising: after receiving the modification to the XML representation, upon receiving a focus on a selectable control contained in the ribbon-shaped graphical user interface, displaying an identification of the add-in application.

21. The method of claim 18,
wherein the ribbon-shaped graphical user interface includes a gallery providing a second set of one or more selectable controls for providing one or more functionalities to the selected object; and
wherein after receiving the modification, the gallery comprises one or more additional selectable controls in addition to the second set of selectable controls.

* * * * *